United States Patent [19]
Roy et al.

[11] Patent Number: 5,082,739
[45] Date of Patent: * Jan. 21, 1992

[54] METALLIZED SPINEL WITH HIGH TRANSMITTANCE AND PROCESS FOR PRODUCING

[75] Inventors: Donald W. Roy, Golden; James L. Hastert, Lakewood; Kenneth E. Green, Arvada; Lawrence E. Courbrough, Arvada; Aurielo Trujillo, Arvada, all of Colo.

[73] Assignee: Coors Porcelain Company, Golden, Colo.

[*] Notice: The portion of the term of this patent subsequent to Jun. 5, 2007 has been disclaimed.

[21] Appl. No.: 184,729

[22] Filed: Apr. 22, 1988

[51] Int. Cl.$^5$ .................. C04B 35/02; B29D 11/00
[52] U.S. Cl. .................. 428/450; 501/153; 264/65; 264/1.2; 428/450; 428/688; 428/918; 428/702
[58] Field of Search .......... 264/65, 1.2; 501/120, 501/153; 428/450, 688, 918, 702

[56] References Cited

U.S. PATENT DOCUMENTS

| | | |
|---|---|---|
| 3,026,210 | 3/1962 | Coble . |
| 3,186,906 | 6/1974 | Falckenberg . |
| 3,239,322 | 3/1966 | Carter . |
| 3,294,878 | 12/1966 | Carnall, Jr. et al. . |
| 3,392,056 | 7/1968 | Maskalick . |
| 3,431,326 | 3/1969 | Letter . |
| 3,530,209 | 9/1970 | Ho . |
| 3,531,308 | 9/1970 | Bagley . |
| 3,556,843 | 1/1971 | Buck ............... 117/227 |
| 3,587,225 | 5/1986 | Tsukuma et al. ............ 501/105 |
| 3,589,880 | 6/1971 | Clark . |
| 3,676,211 | 7/1972 | Kourtesis . |
| 3,768,990 | 10/1973 | Sellers et al. . |
| 3,853,973 | 12/1974 | Lardtl et al. . |
| 3,875,277 | 4/1975 | Bratton et al. . |
| 3,950,504 | 4/1986 | Belding et al. . |
| 3,974,249 | 8/1976 | Roy et al. . |
| 4,009,042 | 2/1977 | Rittler . |
| 4,047,609 | 9/1977 | Reade . |
| 4,049,582 | 9/1977 | Erickson et al. . |
| 4,056,457 | 11/1977 | Vossen, Jr. . |
| 4,066,481 | 1/1978 | Manasevit et al. . |
| 4,078,711 | 3/1978 | Bell et al. . |
| 4,146,379 | 3/1979 | Copley et al. . |
| 4,147,584 | 4/1979 | Garrison et al. . |
| 4,171,400 | 10/1989 | Rosette et al. ............ 428/357 |
| 4,191,577 | 3/1980 | Buescher et al. . |
| 4,263,374 | 4/1981 | Glass et al. . |
| 4,269,651 | 5/1981 | Glass e al. . |
| 4,273,587 | 6/1981 | Oda et al. . |

(List continued on next page.)

OTHER PUBLICATIONS

James R. Floyd, "Effect of Composition and Crystal Size of Alumina Ceramics on Metal-to-Ceramic Bond Strength," Ceramic Bulletin, vol. 42, No. 2, pp. 65–76.

"Joining of Ceramic-Metal Systems: General Survey," Encyclopedia of Material Science and Engineering, Michael B. Bever, ed., pp. 2463–2475 at 2470.

R. Gentilman, et al., Raytheon Company, Research Division, Waltham, MA 02154, "High Durability Missile Domes," Interim Technical Report for Period One, Oct. 1977 through Sep. 30, 1978.

"ASRAAM Development," International Defence Review, vol. 7, pp. 1171–1172 (1985).

M. D. Herr, et al., "Evaluation of a Statistical Fracture Criteria for Magnesium Fluoride Seeker Domes," Naval Weapons Center, N.W.C. Technical Publication 6226 (1980).

(List continued on next page.)

Primary Examiner—Olik Chaudhuri
Assistant Examiner—Andrew Griffis
Attorney, Agent, or Firm—Sheridan, Ross & McIntosh

[57] ABSTRACT

A metallized spinel material and a method for producing a metallized spinel material are provided. The spinel is a high-transmissive material and, particularly, has high transmission in the ultraviolet and, preferably, the visible infrared wavelength regions as well. The high-transmissivity spinel material is metallized by applying the slurry containing a metal, such as tungsten, molybdenum and/or manganese to the substrate, and firing at en elevated temperature such as 1200° to 1800° C., preferably 1500° to 1800° C. for about ½ hour in a non-oxidizing atmosphere.

25 Claims, 13 Drawing Sheets

| | | |
|---|---|---|
| 4,296,065 | 10/1981 | Ishii et al. .......................... 264/325 |
| 4,304,461 | 12/1981 | Stewart et al. . |
| 4,316,936 | 2/1982 | Hing . |
| 4,347,210 | 8/1982 | Maguire et al. ................. 264/294 |
| 4,401,767 | 7/1983 | Dietz et al. . |
| 4,412,963 | 11/1983 | Hing . |
| 4,436,785 | 3/1984 | Dietz et al. . |
| 4,459,166 | 7/1984 | Dietz et al. . |
| 4,461,750 | 7/1984 | Chess et al. . |
| 4,471,026 | 9/1984 | Nicolas et al. . |
| 4,488,673 | 12/1984 | Hopper, Jr. . |
| 4,520,116 | 5/1985 | Gentilman et al. . |
| 4,524,138 | 6/1985 | Schwetz et al. . |
| 4,535,029 | 8/1985 | Intrater et al. . |
| 4,543,346 | 9/1985 | Matsui . |
| 4,584,151 | 4/1986 | Matsui et al. . |
| 4,585,972 | 4/1986 | Hing . |
| 4,600,658 | 7/1986 | Anderson et al. . |
| 4,604,299 | 8/1986 | De Luca et al. . |
| 4,666,251 | 5/1987 | Liberman . |
| 4,701,352 | 10/1987 | De Luca et al. . |

OTHER PUBLICATIONS

R. Lopez, "How the Hardware is Progressing," International Defense Review vol. 1, pp. 84-85 (1986).

"Stinger," Air Defense Artillery Magazine, Issue 1, p. 33 (1985).

P. C. Archibald, et al. "Scattering From Infrared Missile Domes," SPIE, vol. 133, pp. 71-75 (1978).

G. W. Ewing, Instrumental Methods of Chemical Analysis, 3d ed. p. 8, McGraw-Hill Book Co.

"Ultraviolet Radiation" Van Nostrands' Scientific Encyclopedia, 4th ed., pp. 1908-1909.

M. W. Benecke, et al., "Effect of LiF on Hot-Pressing of MgO," Journal of the American Ceramic Society, vol. 50, No. 7, pp. 365-368.

M. E. Thomas, et al., "Infrared Transmission Properties of Sapphire, Spinel, and Yttria as a Function of Temperature," SPIE vol. 683, pp. 41-48 (1986).

J. A. Cox, et al. "Comparative Study of Advanced IR Transmissive Materials," SPIE, vol. 683 (1986).

R. L. Gentilman, "Current and Emerging Materials for 3-5 Micron IR Transmission," SPIE, vol. 683, pp. 2-11 (1986).

P. C. Archibald, et al., "Optical Measurements on Advanced Performance Domes," SPIE, vol. 505 (1984).

"Techbits," vol. 66-2, pp. 11-14, Kodak Periodical, p-3, pp. 11-12 (1966).

"Transparent $MgAl_2O_4$ Spinel, a Broad Band Window Material for Fuzes and Guidance Systems," Roy, et al.

"Infrared Transmitting Glasses," Product Information No. 3112/le, Schott Glass Technologies, Inc. May 1982.

Roy, et al., "Polycrystalline $MgAl_2O_4$ Spinel for Use as Windows and Domes From 0.3 to 0.6 Microns."

Gentilman, "Fusion-Casting of Transparent Spinel," American Ceramic Society Bulletin, vol. 60, p. 906 (1981).

Lacour, "Relationship Between Thermal Chemical Treatment and Transparency of $MgAl_2O_4$ Prepared from Freeze-Dried Liquid Solutions," Science Sintering, vol. 12, No. 1, pp. 39-48.

Strobel, "Thermostructural Evaluation of Spinel Infrared (IR) Domes," SPIE vol. 297 Emerging Optical Materials, pp. 125-136 (1981).

Musikant, "Development of a New Family of Improved Infrared (IR) Dome Ceramics," SPIE, vol. 297 Emerging Optical Materials (1981) pp. 1-12.

Rice, et al., "Ambient Strength and Fracture Behavior of $MgAl_2O_4$," Proceedings of 1971 International Conference on Mechanical Behavior of Materials, vol. 4, pp. 422-431.

Roy, "Development of Hot Pressed Spinel for Multispectral Windows and Domes," Technical Report AFWAL-TR-81-4005.

Gatti, "Development of a Process for Producing Transparent Spinel Bodies," Final Report Contract in 00019-69-C-0133 (9-69).

Gatti, "Development of a Process for Producing Transparent Spinel Bodies," Final Report Contract N00019-71-C-1026.

Plamour III, "Development of Polycrystalline Spinel for Transparent Armour Application," Final Report Contract DAAG 46-69-C-0097.

M. Hirota, "X-Ray Studies on the Reaction Product formed in the Metallized Layer-Ceramic Interface of Metal-to-Ceramic Seal," Transactions-Japanese Institute of Metals, vol. 9, pp. 266-272 (1986).

"Metallizing for Ceramics," Ceramic Industry-Japan, p. 7 (Jan. 1988).

"Metallizing," Advanced Ceramics Report, p. 2 (1986).

W. J. Tomlinson, "Low Temperature Metallization of Debased Alumina," Surface and Coatings Technology, vol. 27, pp. 23-28 (1986).

(List continued on next page.)

OTHER PUBLICATIONS

C. A. Calow, et al., "The Solid State Bonding of Nickel to Alumina," *Journal of Material Science*, vol. 6, pp. 156-163 at 159 (1971).

"Technology Update," *Ceramic Bulletin*, vol. 67, No. 1, p. 64 (1988).

J. E. McDonald, et al., "Adhesion In Alumninum Oxide-Metal Systems," *Transactions of the Metallurgical Society of AIME*, vol. 233, pp. 512-517 (1965).

Encyclopedia for Material Science and Engineering, vol. 1, Bever ed., pp. 584-587, 595-611.

Kohno, et al. "Metallization of Non-Oxide Ceramics," *British Ceramic Proceedings*, vol. 37, pp. 125-130 (1968).

Morozumi, et al. "Bonding Mechanism Between Alunina and Niobium," *Journal of Materials Science*, vol. 16, pp. 2137-2144 (1981).

R. J. Bratton & S. M. Ho, "$MgAl_2O_4$ Fibers and Platelets," *Journal of the American Ceramic Society*, vol. 51, No. 1, pp. 56-57 (1968).

R. J. Bratton, "Coprecipitates Yielding $MgAl_2O_4$ Spinel Powders," *Ceramic Bulletin*, vol. 48, No. 8, pp. 759-762 (1969).

R. J. Bratton, "Characterization and Sintering of Reactive $MgAl_2O_4$ Spinel," *Ceramic Bulletin*, vol. 48, No. 11, pp. 1069-1075 (1969).

R. J. Bratton, et al., "Densification Phenomena in the Hot-Pressing of Spinel," *Journal of Materials Science*, vol. 7, pp. 1363-1368 (1972).

R. J. Bratton, "Translucent Sintered $MgAl_2O_4$," *Journal of the American Ceramic Society*, vol. 57, No. 7, pp. 283-286 (1974).

"A Reconsideration of Stress and Other Factors in the Kinetics of Densification," *Kinetics of Reactions in Ionic Systems*, pp. 392-407 (1969), H. Palmour III, et al.

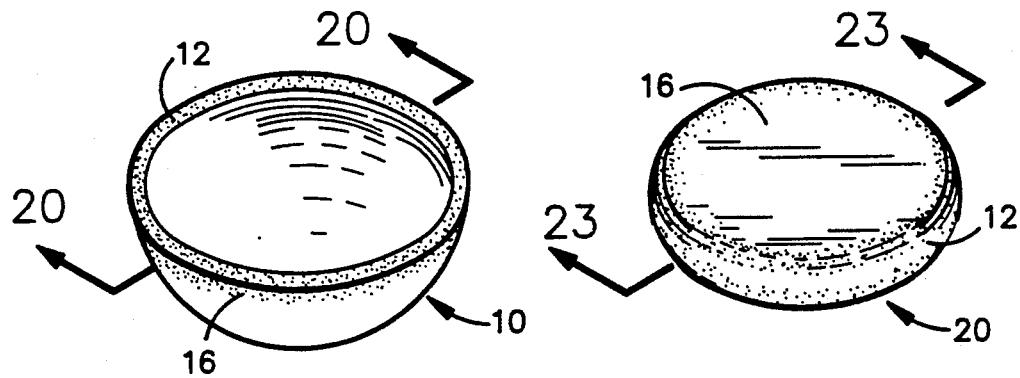
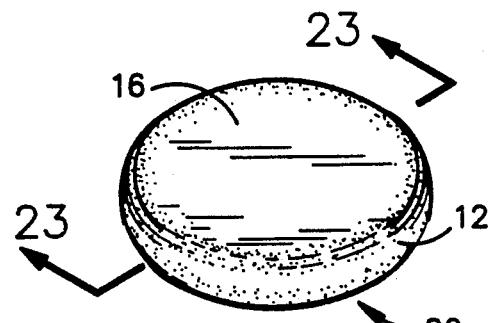
FIG.19    FIG.22
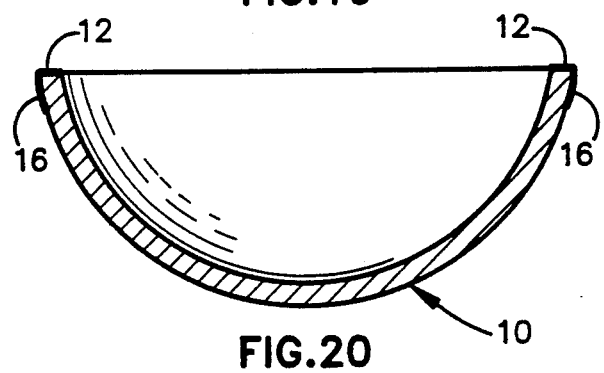
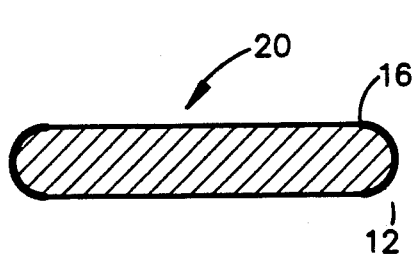
FIG.20    FIG.23
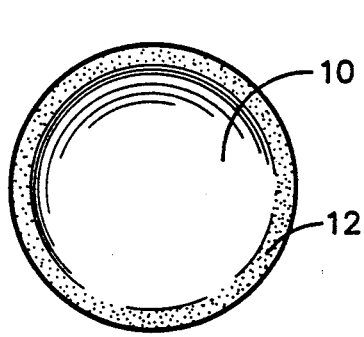
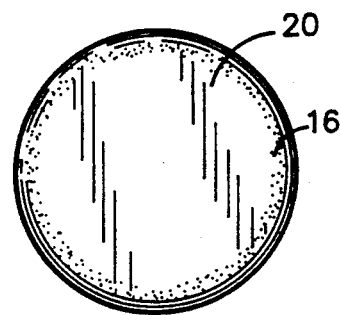
FIG.21    FIG.24
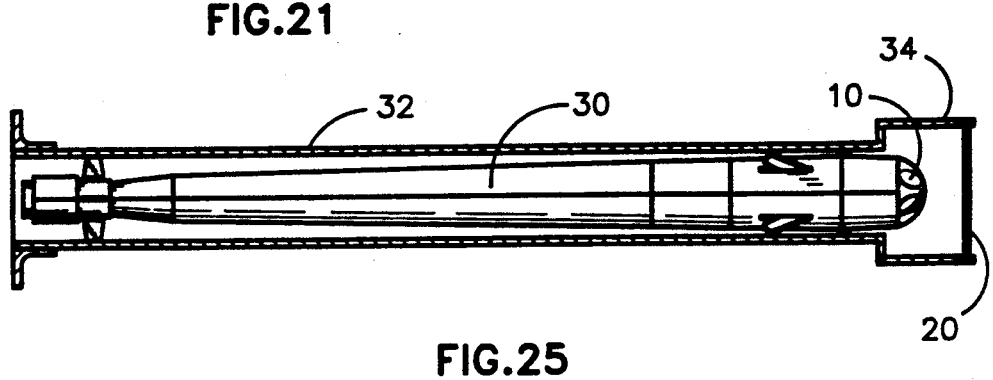
FIG.25

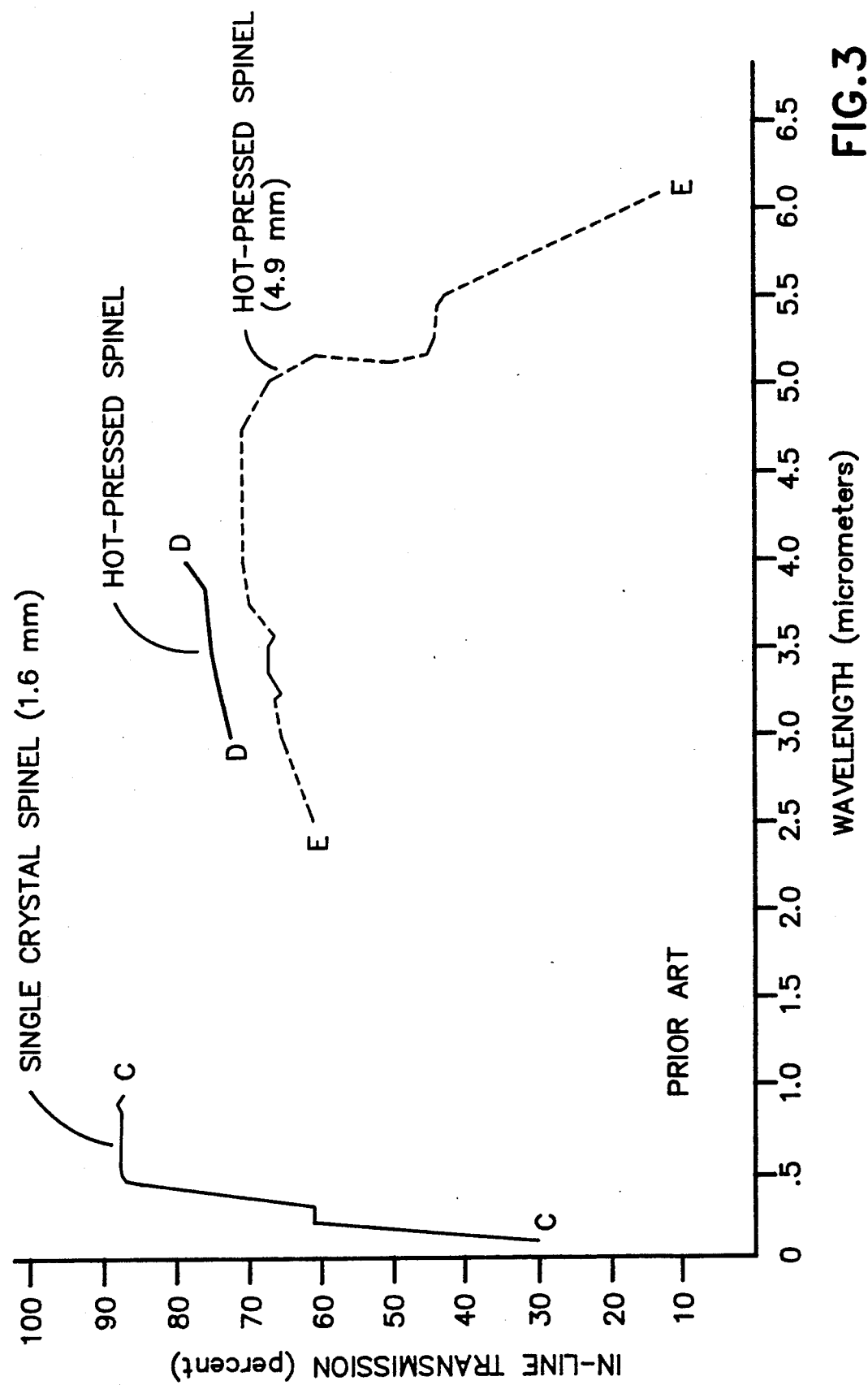

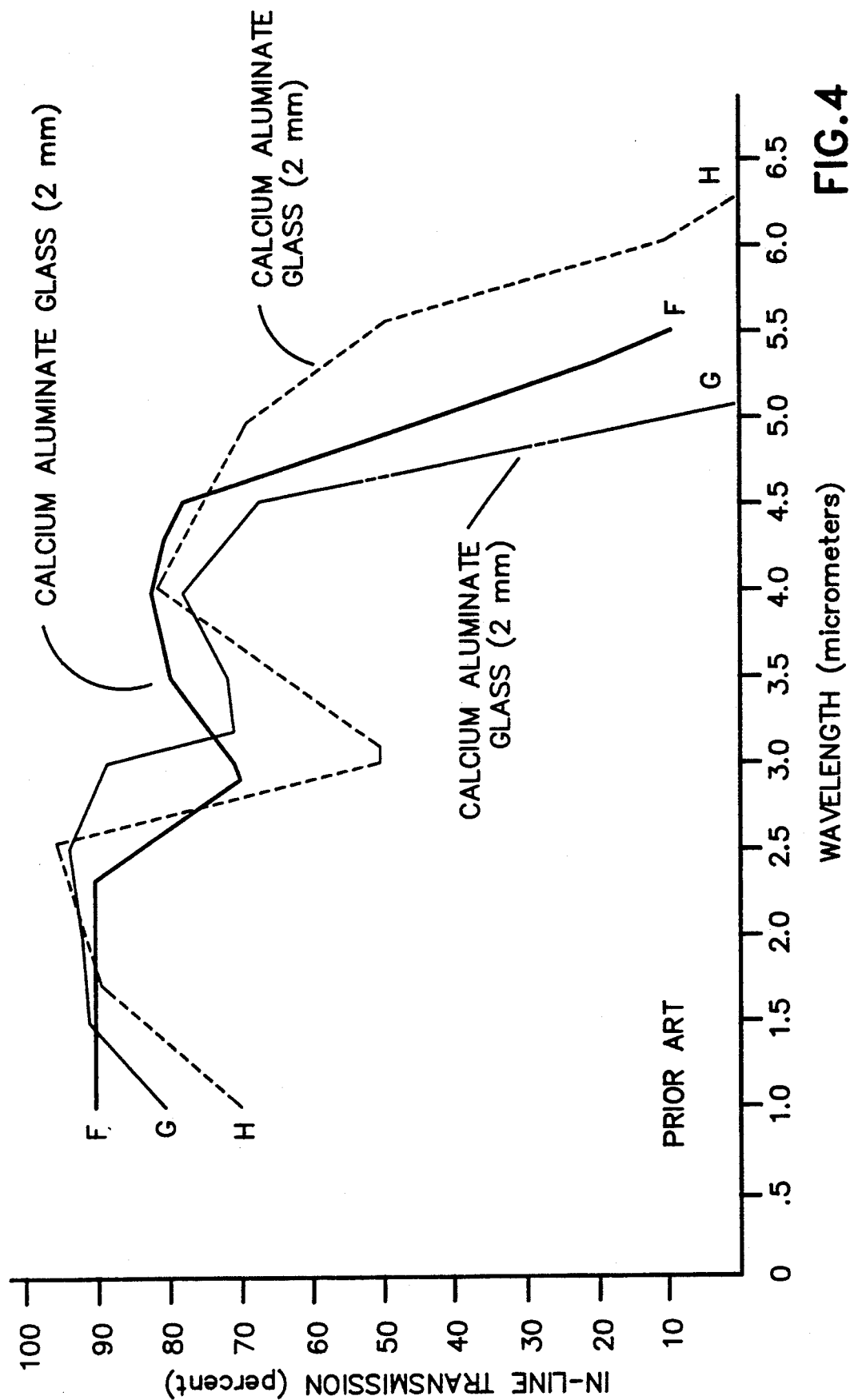

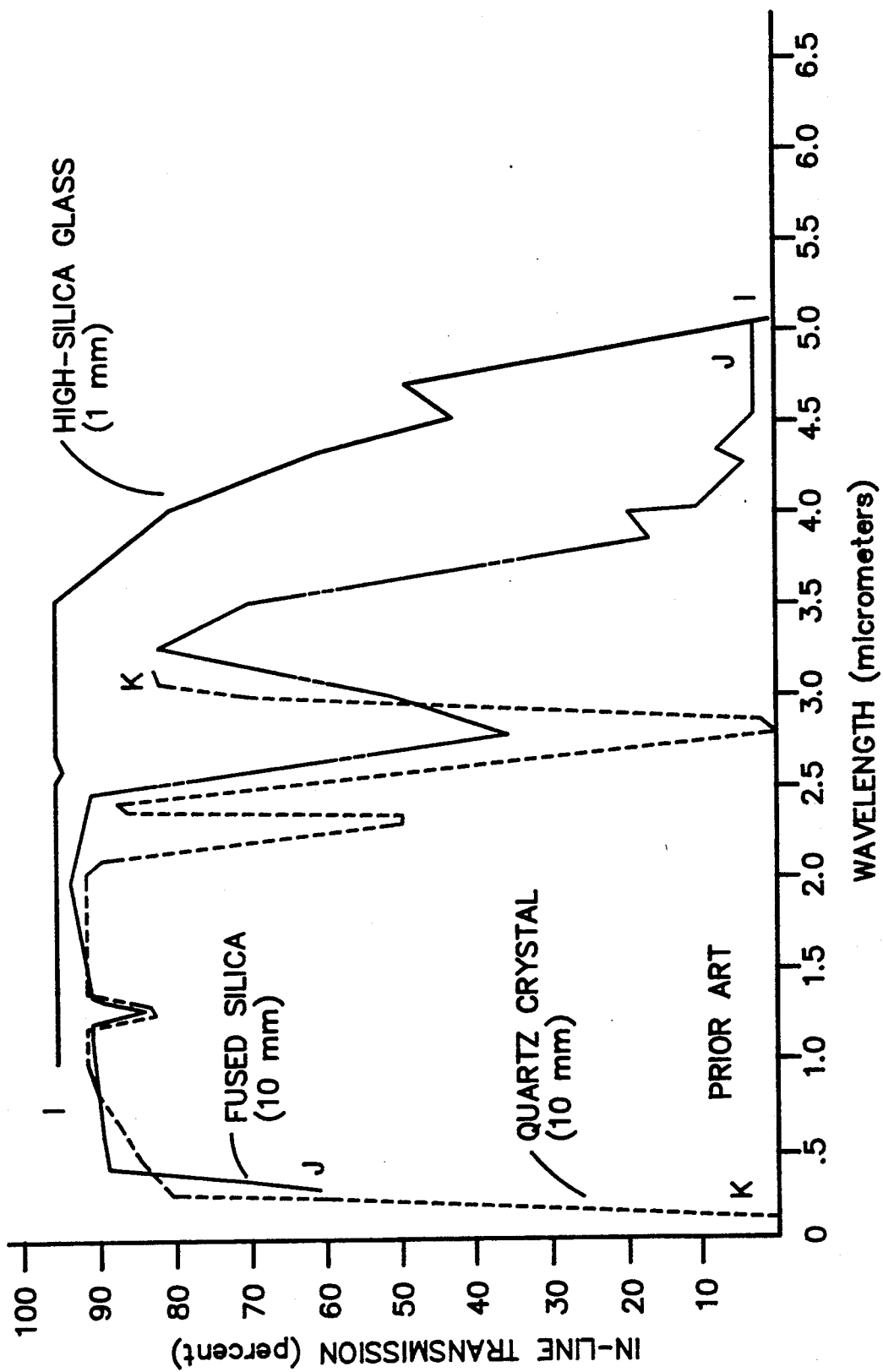

METALLIZED SPINEL WITH HIGH TRANSMITTANCE AND PROCESS FOR PRODUCING

This application is a continuation in part of U.S. patent application Ser. No. 047,403 for "Transparent Poly-Crystalline Body With High Ultraviolet Transmittance", abandoned after the filing of continuation U.S. patent application Ser. No. 374,637, U.S. patent application Ser. No. 047,428 for "Method For Producing Transparent Polycrystalline Body With High Ultraviolet Transmittance", and U.S. patent application Ser. No. 047,422 for "Dome And Window For Missiles And Launch Tubes With High Ultraviolet Transmittance", all abandoned after the filing of continuation U.S. patent application Ser. No. 363,355, filed May 6, 1987.

FIELD OF THE INVENTION

The present invention relates to metallized spinel and a process for producing metallized spinel and, in particular, to a spinel substrate with high ultraviolet transmittance which has been metallized over at least a portion of its surface.

BACKGROUND INFORMATION

Spinel is useful for a number of optical, electro-optical and electrical applications including use as a dome, window or port cover for optical instrumentation, such as optical guidance instrumentation in a guided missile or other weaponry. Because of its high optical transparency in ultraviolet, visible and infrared portions of the spectrum, spinel is also useful for electro-optical and electronics applications including use in connection with laser, light-coupled switches, light guides, photo-FET, photo-transistors, photo-diodes, fiber-optic and optical computer applications, and as substrates for electronic circuitry, chip carriers and the like. A number of uses of spinel require that the spinel be bonded or joined to a second material, such as a metallic material. One method useful in achieving such joining is metallization of the spinel, i.e. provision of an adherent metallic layer over at least a portion of the spinel surface. Typically, such metallization layer is used in connection with joining the spinel to a metallic material, such as by brazing, soldering, and similar joining methods. Metallization is also useful for providing conductive pathways for electronics use, including formation of chip carriers, hybrid circuit boards, resistors, capacitors, transistors, and integrated circuits, microwave device substrates, surface acoustic wave devices, resistance temperature devices, and similar electronics-related devices.

Metallization can also be useful in connection with altering physical characteristics of the substrate, such as strength, toughness, abrasion resistance, reflectivity, infrared emission characteristics, and the like.

Most uses for metallization require a relatively strong bond or adherence between the metallization layer and the substrate. In applications where the metallized substrate will be subjected to adverse environments, such as corrosive environments, high temperature environments, high pressure or low pressure environments, and the like, the metallization should remain sufficiently bonded to continue to provide the desired function. In particular, because the coefficient of thermal expansion for spinel is typically different from that for most metals used for metallization purposes, the bonding should be sufficient to withstand any tendency to weaken or loosen the bond or adhesion between the spinel and the metallization layer such as from the stress induced by differential thermal expansion.

Many previous metallization techniques have included treatment of the spinel surface in a manner which would interfere with the optical characteristics of the spinel, such as by providing a roughened or abraded or etched surface. In optics applications, however, it is often necessary to provide the spinel substrate not only in a nonroughened condition but in a highly polished condition, such as a spinel substrate polished to optical quality. Moreover, many workers believed that it was not possible to successfully metallize a single-phase ceramic without using a metal oxide composition and, in particular, believed that it was not possible to metallize with a molybdenum/manganese paste.

A number of metallization techniques require that the substrate be heated to relatively high temperatures. When the metallized spinel is to be employed in optical applications, the metallizing process should not result in sagging, deformation, substantial sublimation or other effects which could interfere with the optical quality of the substrate.

Among the tests which can be used to assist in evaluating the degree of adhesion or bonding of the metallization layer to the spinel, is a pull test. In the pull test, a material, typically a pin, is brazed to the metallization layer and the force, divided by the brazed surface area, which is required to pull the metallized material away from the spinel is measured. Pull test adhesion is typically expressed in terms of pressure, i.e. force per unit area.

Accordingly, there is a need for materials and methods to metallize a high-ultraviolet-transmitting spinel, particularly a spinel which has been polished to optical quality, preferably without interfering with the optical characteristics of the spinel. The metallized spinel should have high pull-test adherence and preferably should be able to withstand high temperatures, such as about 500° C. (ABOUT 1000° F.).

SUMMARY OF THE INVENTION

The present invention relates to a metallized spinel substrate in which the substrate has particularly advantageous optical qualities including having an in-line transmittance per 1.88 millimeter thickness in all wavelengths in the wavelength range from about 0.2 microns to about 0.4 microns of not less than the transmittance shown by Line A in FIG. 2. Preferably, the substrate has an in-line transmittance per 1.88 mm thickness in all wavelengths from about 0.3 microns to about 0.8 microns and not less than about 85 percent and/or at some wavelength in the wavelength range from about 0.2 microns to about 0.3 microns of not less than about 72 percent.

The substrate can be produced by a method comprising producing a closed porosity body from a magnesia-alumina spinel powder and heating the closed porosity body to at least about 1400° C. at elevated pressures of at least about 20,000 psi to reduce residual porosity.

The metallizing material is preferably either a tungsten-containing material or a mixture of molybdenum and manganese. Metallization can be achieved by spraying a metallic mixture onto the substrate and firing at an elevated temperature. The mixture which is sprayed can contain carriers, solvents, binders and the like and the firing preferably is done at about 1300° C. to about 1800° C., preferably about 1500° C. to about 1800° C.

The metallization layer of spinel metallized according to the present invention has a sufficiently high adherence to withstand a pulling force of about 50 MPa, preferably at least about 80 MPa, and most preferably a pulling force of about 130 MPa to about 140 MPa or more.

BRIEF DESCRIPTION OF THE FIGURES

FIG. 3 illustrates spectral transmission curves of single crystal and hot-pressed spinel bodies;

FIG. 4 illustrates spectral transmission curves of calcium aluminate glasses;

FIG. 5 illustrates spectral transmission curves of quartz crystal and silica and fused silica glass;

FIG. 19 depicts an edge and partial surface metallized spinel dome according to the present invention;

FIG. 20 is a cross-sectional view taken along Line 20—20 of FIG. 19;

FIG. 21 is a bottom plan view of the embodiment of FIG. 19;

FIG. 22 is a perspective view of an edge and partial surface metallized spinel window according to the present invention;

FIG. 23 is a cross-sectional view taken along Line 23—23 of FIG. 22;

FIG. 24 is a top plan view of the embodiment of FIG. 22; and

FIG. 25 is a schematic cross-sectional view of a missile having a metallized dome and residing in a launch tube having a metallized window.

DETAILED DESCRIPTION

The present invention includes metallization of a spinel substrate which has been produced in a fashion such that it has high optical transmission, particularly in the ultraviolet region, between about 0.2 microns and about 0.4 microns wavelength.

Figure 1:
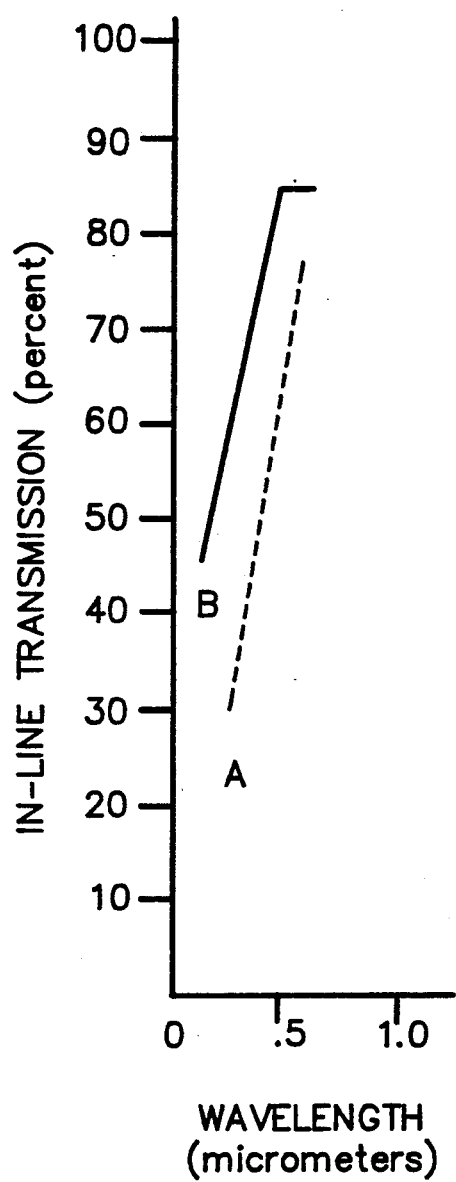
FIG. 1 illustrates a preferred and a more preferred in-line transmission of spinel substrates usable in connection with the present invention.
Figure 2:
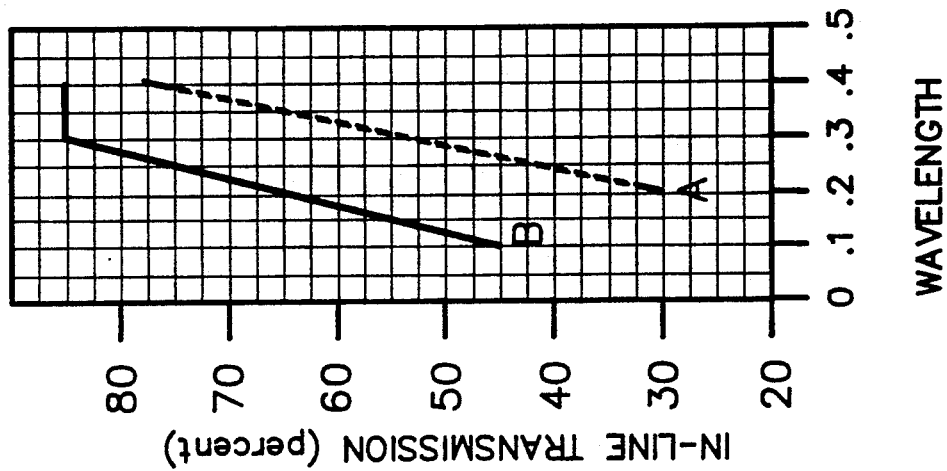
FIG. 2 depicts the transmission curves of FIG. 1 in greater detail.
Figure 13:
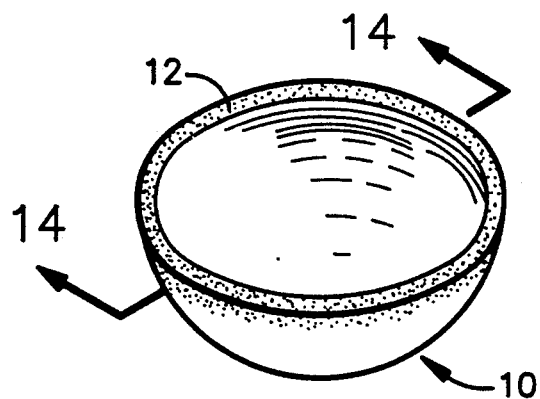
FIG. 13 is a perspective view of an edge-metallized spinel dome according to the present invention.
Figure 16:
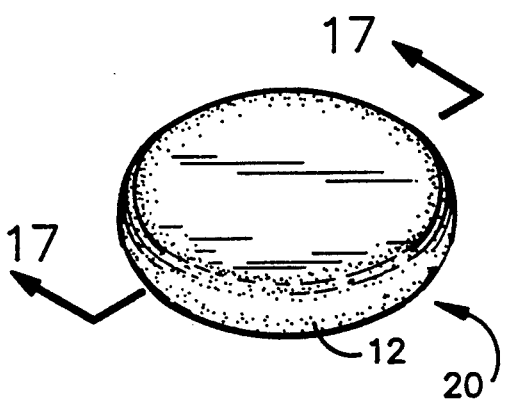
FIG. 16 depicts an edge-metallized spinel window according to the present invention.
Figure 14:
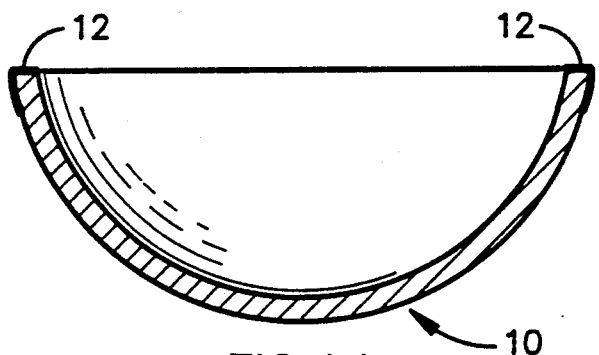
FIG. 14 is a cross-sectional view taken along Line 14—14 of FIG. 13.
Figure 17:
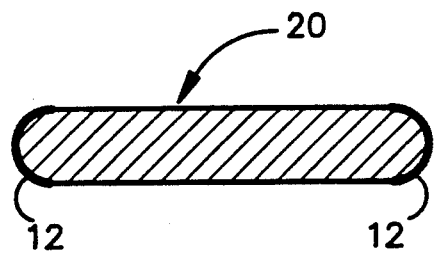
FIG. 17 depicts a cross-sectional view taken along Line 17—17 of FIG. 16.
Figure 15:
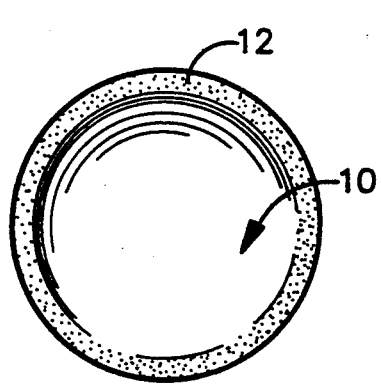
FIG. 15 is a top plan view of the device of FIG. 13.
Figure 18:
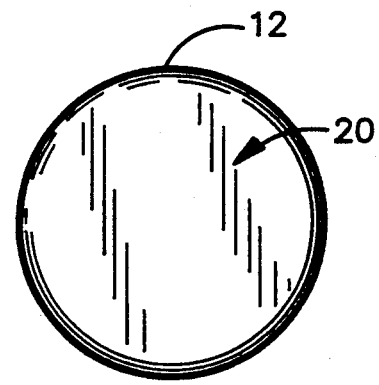
FIG. 18 is a top plan view of the embodiment of FIG. 16.
Figure 6:
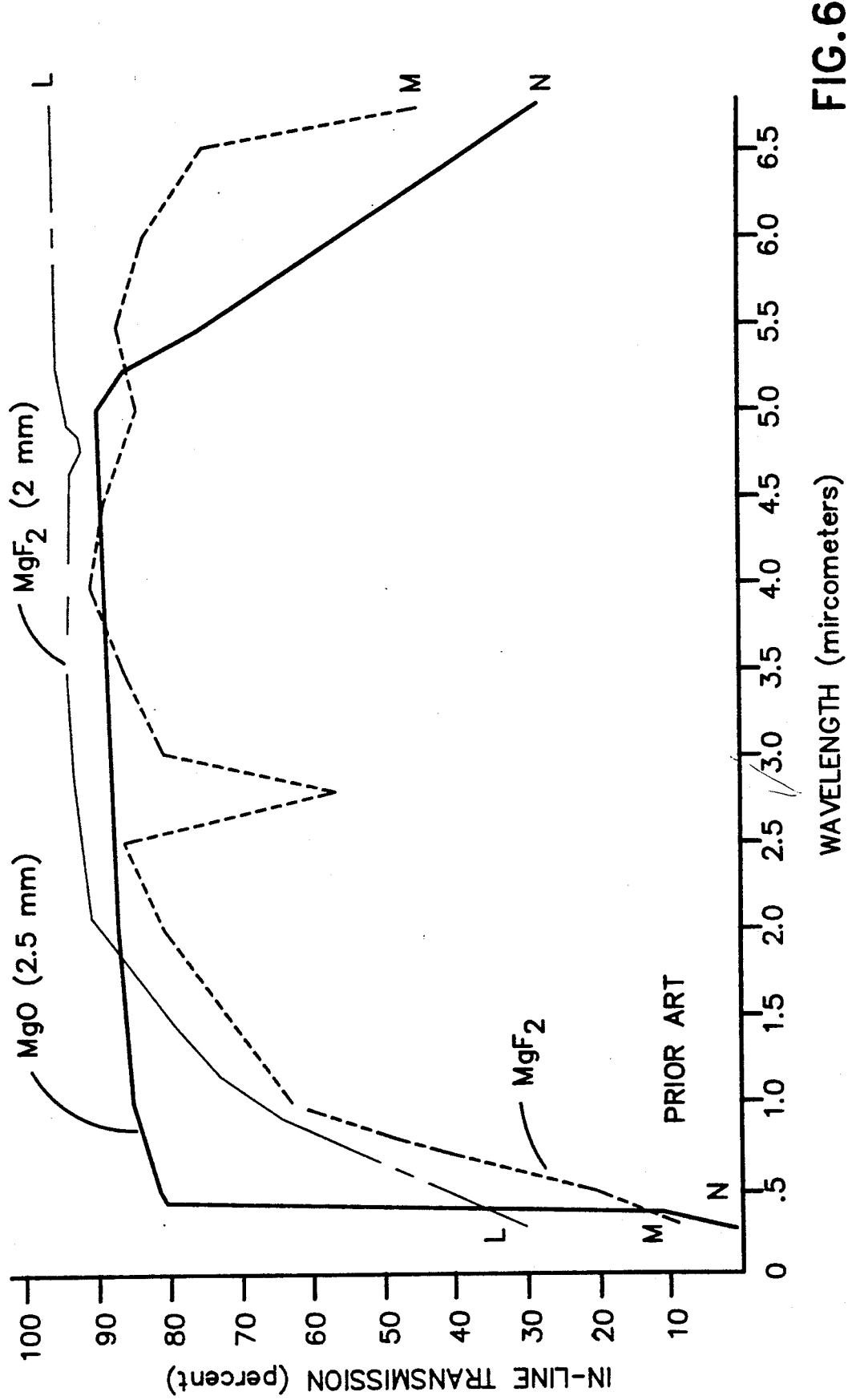
FIG. 6 illustrates spectral transmission curves of MgO and $MgF_2$.
Figure 7:
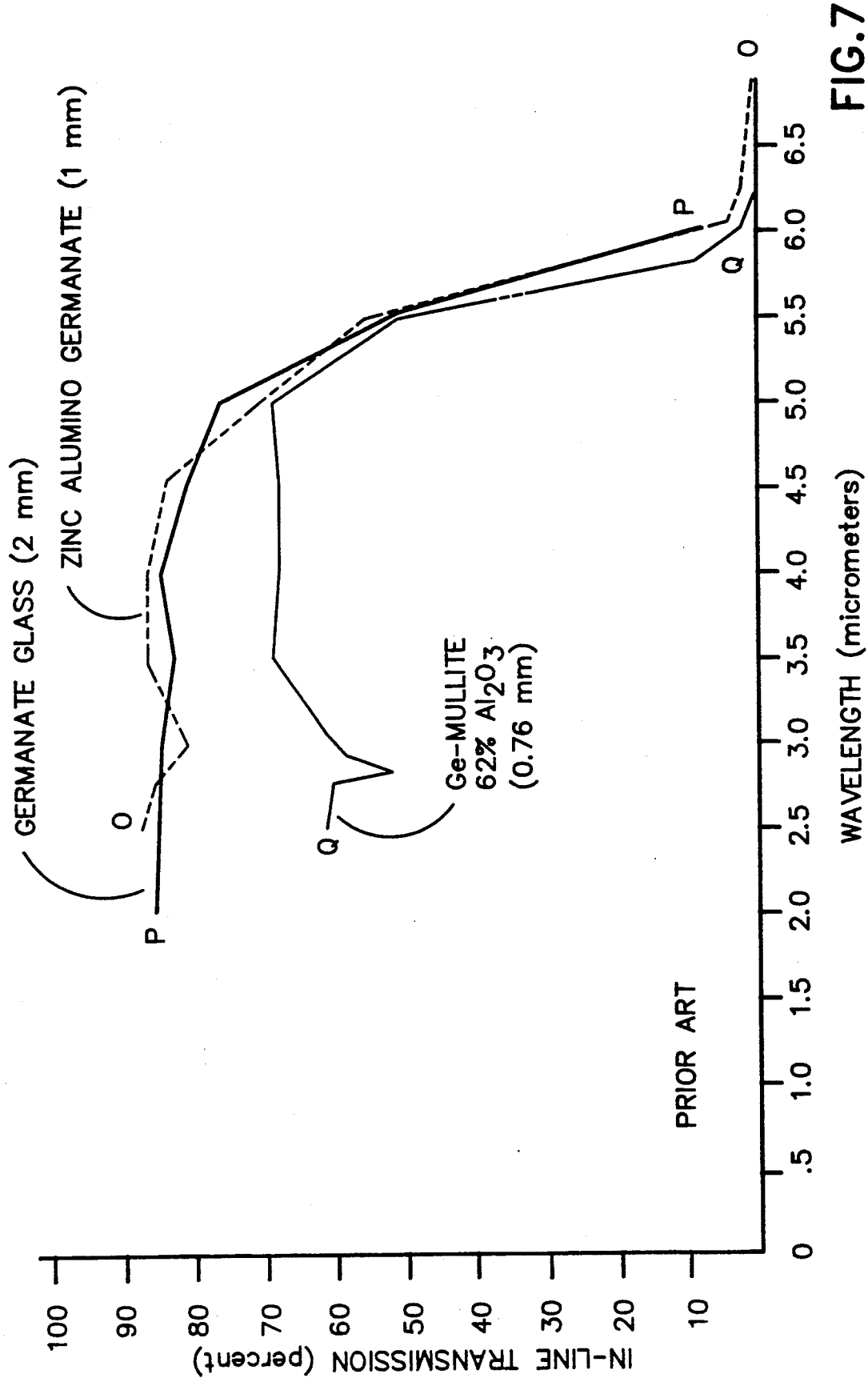
FIG. 7 illustrates spectral transmission curves of zinc alumino germanate and germanate glasses.
Figure 8:
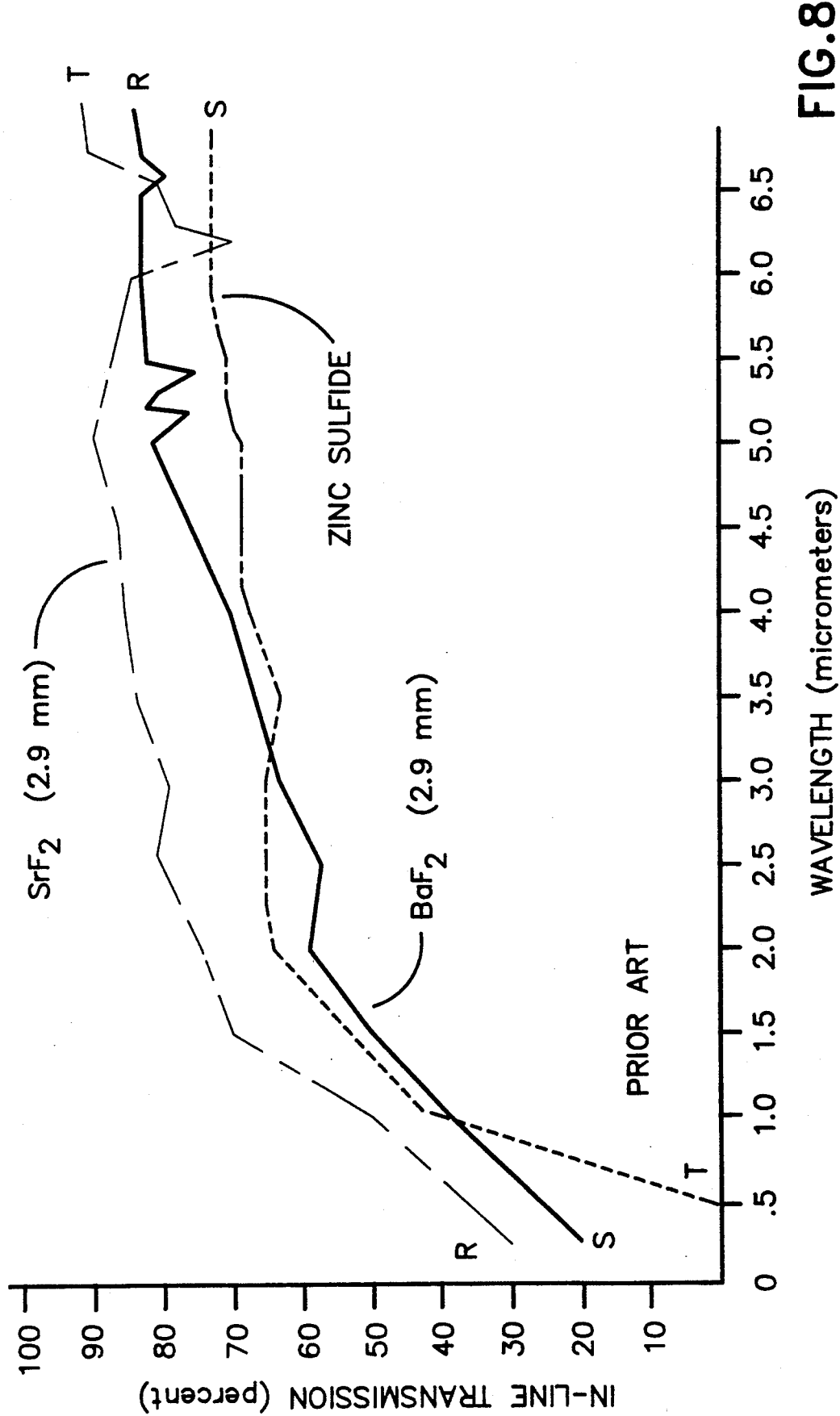
FIG. 8 illustrates spectral transmission curves of $SrF_2$, $BaF_2$, and zinc sulfide.
Figure 9:
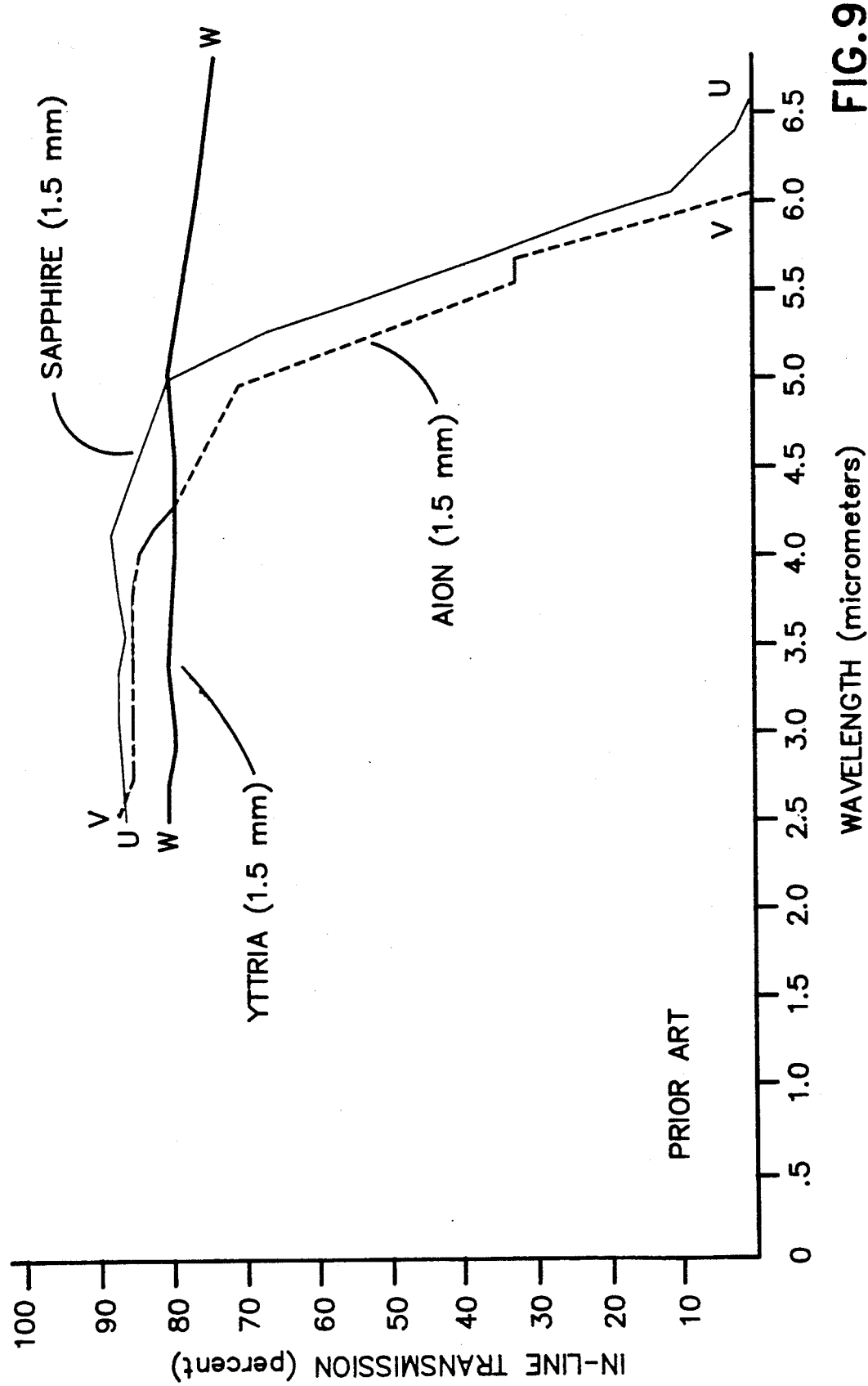
FIG. 9 illustrates spectral transmission curves of sapphire, AlON, and yttria.
Figure 10:
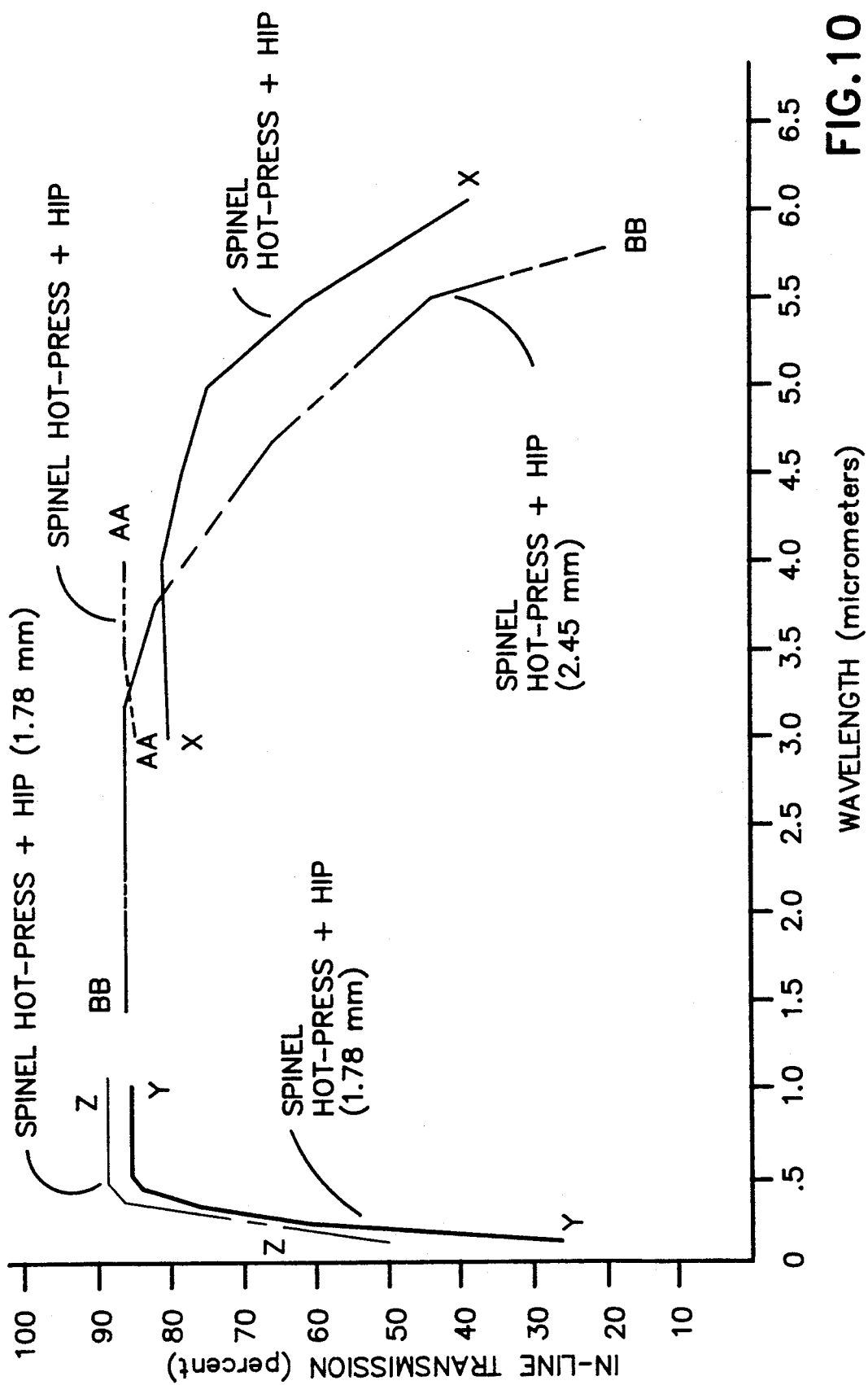
FIG. 10 illustrates spectral transmission curves of a number of samples of spinel material with high ultraviolet transmittance.

The spinel bodies or substrates have an in-line transmittance depicted by line A in FIGS. 1 and 2. The spinel materials are capable of a transmittance even greater than that depicted by line A in FIGS. 1 and 2 and, accordingly, the present invention can be used in connection with a sintered body with a transmittance greater than or about equal to that depicted by line B in FIGS. 1 and 2. A sintered body usable in connection with the present invention also has good transmittance in the infrared wavelength region, having an in-line transmittance per 1.88 mm thickness at all wavelengths from 3 microns to 5 microns of not less than about 73 percent, preferably not less than about 76 percent, and, at all wavelengths from about 3 microns to 4 microns of not less than about 81 percent, preferably not less than about 84 percent.

The body preferably has, in its uncoated, unmetallized state and with a thickness of about 1.88 mm, a transmittance not less than 85 percent in all wavelengths from 0.3 to 0.8 microns and not less than about 72 percent at some wavelength from 0.2 to 0.3 microns. Further, the body preferably has a transmittance not less than about 73 percent in all wavelengths from about 3 microns to about 5 microns and has a transmittance of at least about 86 percent at some wavelength from about 0.2 to about 0.4 microns. The body preferably has, in its uncoated, unmetallized state and with a thickness of about 1.88 mm, a transmittance greater than about 30 percent, preferably greater than 40 percent, and most preferably greater than about 45 percent, at a wavelength of about 0.2 microns and a transmittance greater than about 84 percent and preferably greater than about 85 percent at a wavelength of about 0.4 microns.

Lines C through E of FIG. 3, provided for purposes of comparison, depict transmittance reported for spinel bodies produced by previous methods. Lines F through W of FIGS. 4–9 depict transmittances reported for sintered bodies made of non-spinel materials as described in Table 1, and are provided for comparison purposes.

TABLE 1

| Curve | FIG. | Material | Thickness (mm) |
|---|---|---|---|
| C | 3 | single-crystal spinel | 1.6 |
| D | 3 | hot-pressed spinel | — |
| E | 3 | hot-pressed spinel | 4.9 |
| F | 4 | calcium-aluminate glass | 2 |
| G | 4 | calcium-aluminate glass | 2 |
| H | 4 | calcium-aluminate glass | 2 |
| I | 5 | high-silica glass | 1 |
| J | 5 | fused silica | 10 |
| K | 5 | quartz crystal | 10 |
| L | 6 | $MgF_2$ | 2 |
| M | 6 | $MgF_2$ | — |
| N | 6 | MgO | 2.5 |
| O | 7 | zinc alumino germanate | 1 |
| P | 7 | germanate glass | 2 |
| Q | 7 | Ge-mullite 62% $Al_2O_3$ | 0.76 |
| R | 8 | $SrF_2$ | 2.9 |
| S | 8 | $BaF_2$ | 2.9 |
| T | 8 | zinc sulfide | — |
| U | 9 | sapphire | 1.5 |
| V | 9 | AlON | 1.5 |
| W | 9 | yttria | 1.5 |

Figure 12:
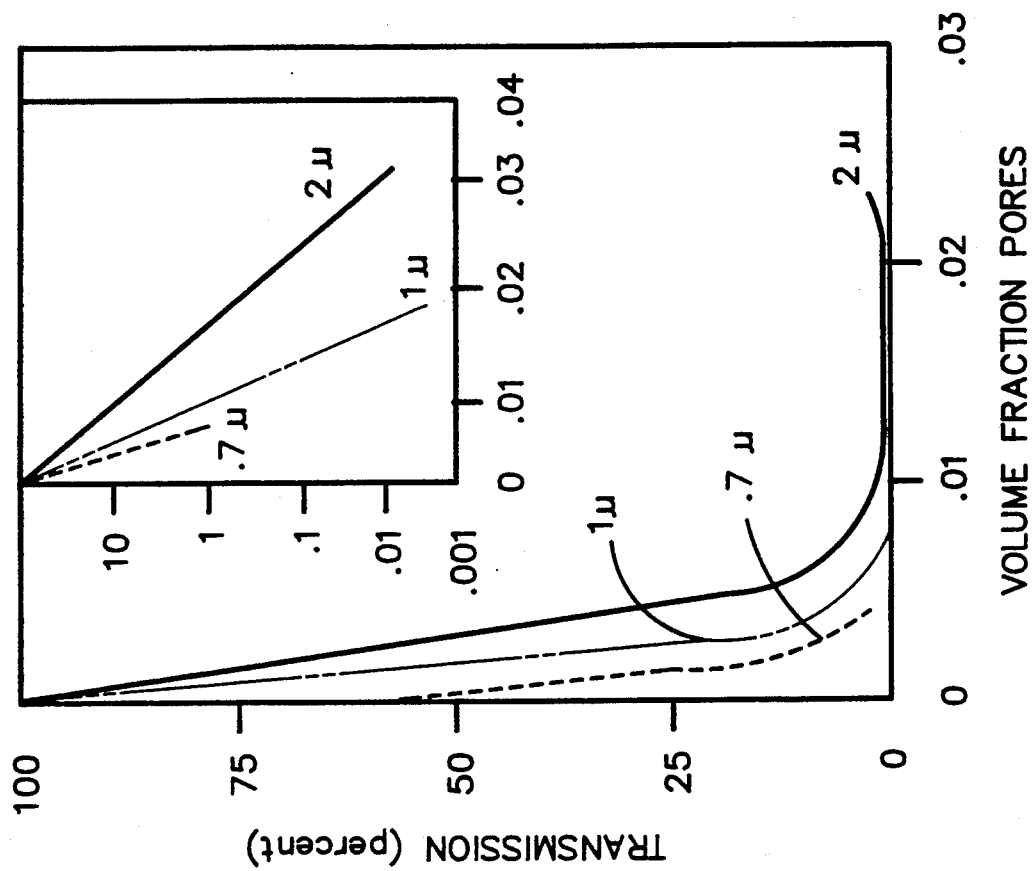
FIG. 12 illustrates a relationship between optical transmission and porosity used to obtain porosity from measurements of optical transmission.

A sintered body used in connection with the present invention comprises spinel and preferably contains more than about 99.9 weight percent spinel. Spinel is a useful material for optical applications such as instrument ports because, among other reasons, spinel is non-birefringent, has a cubic structure, and is substantially non-hygroscopic. The sintered transparent body has a porosity of less than 0.01 percent, preferably less than about 0.001 percent by volume and an average pore radius less than about 0.1 microns. Porosity in such low range is difficult to measure by ordinary displacement methods. Porosity can be measured using electron micrographs of the sintered body. Another method of determining porosity is to calculate porosity from measured light transmittance, e.g. by using the graphical relationship depicted in FIG. 12, which applies generally to material such as the material which is the subject of this invention.

The polycrystalline body usable in connection with the present invention has a scatter of less than about $9 \times 10^{-3}$, preferably less than about $8 \times 10^3$, and most preferably less than $7 \times 10^{-3}$ at a wavelength of about 0.6471 microns.

The sintered body can be polished to a scratch-dig size of less than about 20—20. The scratch-dig size of 20—20 represents a maximum scratch size of 0.020 mm (0.0008 inches) in width and a maximum dig size of 0.20 mm (0.008 inches) in diameter. In this context, a scratch is a defect which is long and thin in nature and a dig is a defect which is basically round. The meaning of scratch-dig size is explained fully in Mil-0-13830, pp. 32-34, incorporated herein by reference. Surface quality is specified by two numbers separated by a hyphen, e.g., 60-20. The first number is the maximum "scratch number" and the second number is the maximum "dig number." Scratches are classified as defects which are long and thin in nature, and digs are defects which are basically round. The smaller the number in both instances, the better the surface quality. Surface quality specifications should also integrate defects over the surface of the part. Therefore, looser tolerances should be considered for larger parts. The sintered body has an average grain size less than about 150 microns. Without wishing to be bound by any theory, it is believed that the sintered ceramic grain size is related to the strength of the bond between the metallized layer and the substrate. The sintered body has an average defect radius of less than about 0.005 inches (about 0.12 mm).

The sintered body usable in connection with the present invention provides a relatively low emissivity in the infrared wavelength regions at elevated temperatures. High emissivities interfere with optics measurements and can be detrimental to optical guidance systems such as situations in which missile nose cones are aerodynamically heated during flight. Table 2 provides a comparison of emissivities of hot-pressed spinel with those of sapphire at various temperatures. Since emissivities are primarily material-dependent, it is believed emissivities of spinel material usable in connection with the present invention has emissivities no greater than about those shown in Table 2 for hot-pressed spinel.

TABLE 2

| Temp. (°C.) | Emissivity at 4.5 and 5.0 Microns | | | |
|---|---|---|---|---|
| | Emissivity at 4.5 microns | | Emissivity at 5.0 microns | |
| | spinel | sapphire | spinel | sapphire |
| 30 | 0.078 | 0.051 | 0.157 | 0.199 |
| 200 | 0.091 | 0.074 | 0.203 | 0.268 |
| 400 | 0.118 | 0.119 | 0.280 | 0.370 |
| 600 | 0.151 | 0.168 | 0.361 | 0.477 |
| 800 | 0.194 | 0.229 | 0.461 | 0.587 |
| 1000 | 0.247 | 0.311 | 0.559 | 0.686 |
| 1200 | 0.303 | 0.381 | 0.664 | 0.777 |
| 1400 | 0.381 | 0.468 | 0.788 | 0.848 |

TABLE 2-continued

The sintered body usable in connection with the present invention has a flexural strength, measured according to the ASTM F417 test, measured at 25° C., of at least about 15,000 psi (100 MPa), preferably at least about 20,000 psi (140 MPa), and most preferably at least about 23,000 psi (about 150 MPa). The sintered body has a tensile strength, measured according to the ACMA #4 test of at least about 12,000 psi (about 80 MPa). The material, however, is not so strong that it will resist bursting at a desired level. The sintered body usable in connection with the present invention, when provided in a 3 inch (7.5 cm) diameter disk having a thickness of about 0.06 inches (1.5 mm), bursts when subjected to a pressure of more than about 25 psi (about 0.17 MPa).

The sintered body usable in connection with the present invention is resistant to abrasion or erosion, and particularly, when subjected to dust, sand or water droplets at a velocity of about 500 meters per second, undergoes substantially no degradation of transmittance properties. The sintered body usable in connection with the present invention has a Knoop hardness, measured according to the ASTM E18 test of greater than 1350 kg/mm$^2$, preferably greater than 1500, and most preferably about 1700.

The sintered body usable in connection with the present invention is resistant to degradation under high temperature conditions and, in particular, has a high melting point, preferably above 2000° C.

The sintered body usable in connection with the present invention is stable under exposure to ultraviolet light, and particularly, experiences a loss of transmissivity of less than about 1 percent after being subjected to sunlight or at a distance of about 6 inches (15 cm) to ultraviolet radiation of an intensity of about 700 microwatts/cm$^2$ having a wavelength of about 0.254 microns for about 240 hours.

The sintered body usable in connection with the present invention is chemically and thermally stable. The polycrystalline material of the present invention has a solubility of less than $10^{-3}$ g/100 g water at room temperature. The polycrystalline body has substantially no solubility in an acidic aqueous solution having a pH of between about 7 and about 2. There is substantially no degradation of the body upon exposure to oxidizing materials and there is substantially no degradation of the body upon exposure to temperatures of about 500° C. In this context, substantially no degradation means that the strength, hardness and optical qualities of the material are substantially preserved. In particular, upon exposure to oxidizing materials or to temperatures of about 500° C., the body possesses a knoop hardness of at least about 1038 kg/mm$^2$, a -flexural strength of at least about 15,000 psi, and in-line transmittance per 1.88 mm thickness in all wavelengths in the wavelength range from about 0.2 microns to about 0.4 microns of not less than the transmittance shown by Line A in FIG. 2.

For comparison purposes, Table 3 shows a number of physical properties reported for other optical materials.

TABLE 3

|  | 4-point Flexural Strength (MPa) | Knoop Hardness 20° C. (kg/mm²) | Fracture Strength (MPa) | 550–450° C. Resistance to Thermal Stress (K/E) | 750° C. Resistance to Thermal Shock (w/cm) | Tensile Strength (MPa) | Thermal Conductivity (10-4 cal./ cm sec °C.) | Melting or Softening Temperature (°C.) |
| --- | --- | --- | --- | --- | --- | --- | --- | --- |
| Previous hot-pressed spinel | 103 | 1390 | 193 | 11 | 10 | 110 | 330 | 2135 |
| $MgF_2$ | 100 | 576 | 151 | 3.2 | 9 |  |  | 1255 |
| MgO | 140 | 900 | 158 | 8 | 11 |  | 600 | 2800 |
| $Al_2O_3$ |  | 2200 | 344 | 21 |  |  | 600 | 2030 |
| $Y_2O_3$ | 160 | 800 | 193 | 7 |  |  |  |  |
| ZnS |  | 356 | 103 | 6 |  |  |  |  |
| Fusion-cast spinel | 175 | 1750 |  |  |  |  |  |  |
| Alpha $Si_3N_4$ |  | 2400 |  |  |  |  |  |  |
| AlON | 305 | 1950 | 206 |  |  |  |  | 2140 |
| Germinate glass |  | 460 |  |  |  |  |  |  |

For purposes of comparison, absorption coefficients of other materials are given in Table 4, in which "HP" indicates hot-pressed.

TABLE 4

| Absorption Coefficients ($cm^{-1}$) | | | | | | |
| --- | --- | --- | --- | --- | --- | --- |
| | Wavelength (microns) | | | | | |
| Material | 3.0 | 4.0 | 4.5 | 5.0 | 5.5 | 6.0 |
| Temperature = 17–25° C. | | | | | | |
| Spinel (HP) | .0007 | .0332 | .135 | .465 −.8 | 1.16 −2 | 3.07 |
| Sapphire | .0013 | .061 | .252 | .81 | 2.07 | 5.66 |
| AlON |  |  | .5 | 1.6 |  |  |
| Zirconia |  |  |  |  | 0.5 | 1.5 |
| Yttria | .0001 | .0003 | .0021 | .001 | .037 | .11 −.15 |
| Temperature = 127° C. | | | | | | |
| Spinel (HP) | .0010 | .046 | .186 | .614 | 1.51 | 3.38 |
| Sapphire | .0019 | .083 | .333 | 1.6 | 2.63 | 6.95 |
| Yttria | .001 | .0006 | .0038 | .0017 | .061 | .186 |
| Temperature = 227–250° C. | | | | | | |
| Spinel (HP) | .0015 | .0646 | .243 | .7– .802 | 1.95 −2.3 | 4.74 |
| Sapphire | .0028 | .113 | .437 | 1.3– 1.4 | 3.3 −3.4 | 8.48 |
| AlON |  |  |  | 0.9 | 2.4 |  |
| Zirconia |  |  |  |  | 0.9 | 2.4 |
| Temperature = 477–500° C. | | | | | | |
| Spinel (HP) | .0038 | .135 | .475 | 1.3– 1.46 | 3.4 −3.7 | 7.68 |
| Sapphire | .0069 | .233 | .826 | 2.1– 2.46 | 5.1 −5.65 | 13.38 |
| AlON | 1.3 | 3.7 |  |  |  |  |
| Zirconia |  |  |  |  | 2.0 | 4.5 |
| Yttria | .0001 | .003 | .019 | .072 | .23 | 0.6 |
| Temperature = 727° C. | | | | | | |
| Spinel (HP) | .008 | .244 | .809 | 2.35 | 5.3 | 11.19 |
| Sapphire | .014 | .417 | 1.38 | 2.93 | 8.6 | 19.15 |
| Yttria | .00011 | .009 | 0.42 | .15 | .45 | 1.13 |

The method preferred for producing the transparent sintered body will now be described. According to this method, a magnesia-alumina spinel powder is provided. The spinel powder is of high purity, and particularly, has less than about 5 ppm by weight, preferably less than 3 ppm, of oxides of any of the following elements: Cr, Cu, Fe, Ga, Mn, Pb, Ti, V, Zn, and has less than 50 ppm, preferably less than 30 ppm of the total of all the above oxides. The powder preferably has less than 1,000 ppm, preferably less than 10 ppm of carbon, less than 10 ppm, preferably less than 5 ppm of calcium, less than 30 ppm, preferably less than 5 ppm of sodium, less than 500 ppm, preferably less than 100 ppm of sulfur, less than 1,000 ppm, preferably less than 50 ppm of silicon.

Figure 11:
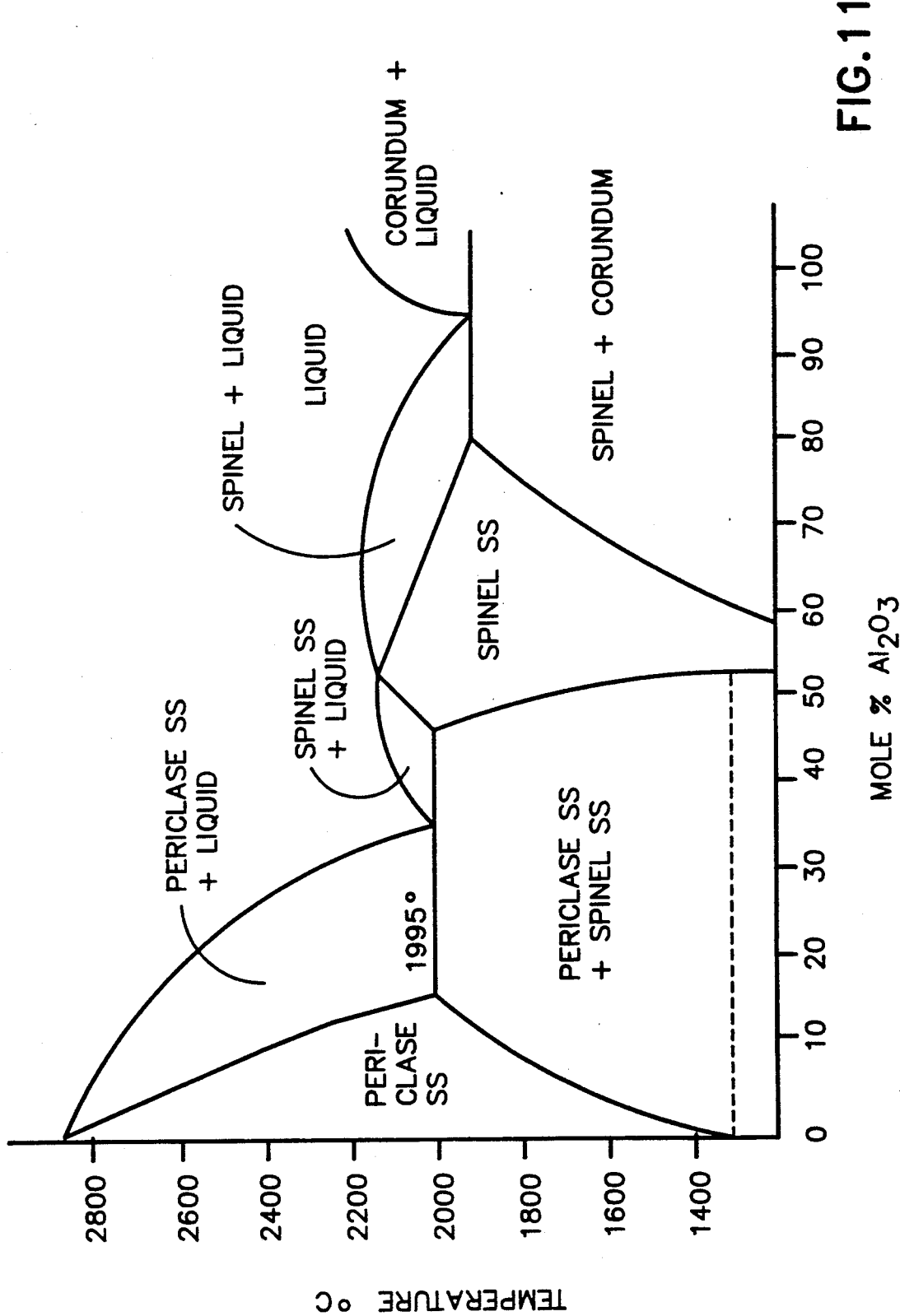
FIG. 11 depicts a phase diagram for the $MgO-Al_2O_3$-spinel system.

The magnesia-alumina powder is a mixture of a powder of MgO and a powder of $Al_2O_3$. The mixture can be in any weight ratio of $Al_2O_3$ to MgO approximately falling in the range indicated by "spinel SS" in FIG. 11. Preferably, the molar ratio of $Al_2O_3$ to MgO in the powder is about 1:1 plus or minus about 5 M/O. The powder preferably has a surface area of between about 10 and about 15 m²/g. The average particle size of the powder is substantially submicron and preferably between 40 and 50 weight percent of the particles have a diameter less than about 1 micron.

The powder is used to form a closed porosity body. The formation of a closed porosity body can be accomplished by hot pressing or pressureless sintering. According to the hot pressing method, the powder is mixed with an amount of hot-pressing aid, e.g., between about 0.5 weight percent and about 3 weight percent, preferably about 1½ weight percent of LiF.

The mixed powder is loaded in a hot press die. The powder compacts substantially upon pressing. The thickness desired for the hot pressed parts preferably will include an allowance for grinding. For example, a finished 0.3 inch (8 mm) thick disk may require the addition of about 0.015 inch (about 0.3 mm) for grind allowance.

The hot press die may be made of graphite, for example, in the form of a cylindrical annulus. A cylindrical bottom die is placed in the bottom of the hot press die. All surfaces of the dies which will be exposed to the spinel are coated with a graphite foil.

According to one method of hot pressing, a single window is produced for each hot pressing operation. According to another hot pressing method, a number of windows are hot pressed simultaneously such as by vertically stacking two or more layers of spinel powder, separated by a parting medium such as graphite or boron nitride. When several windows are hot pressed simultaneously, the spinel layers are preferably separated by graphite spacers sufficiently thick to prevent fracture of the spacers. Spacers of about ½ inch (1.2 cm) thickness are operable, although thinner spacers may also be operable. Products can be produced in a number of shapes including disks and domes.

After the powder and any parting medium is placed into the die, a top punch is placed into the top of the die. For disks, the top punch is a cylindrically-shaped punch and for domes, the top punch is preferably a male punch.

The prepared and filled die is cold pressed at about 100 psi (0.7 MPa). The cold-press pressure must be sufficient to provide for ease of handling and also assists in slightly compacting the powder prior to placing the die in the main press. The cold press pressure must not, however, be so high that closed porosity results.

The cold-pressed body can be treated to fully or partially remove impurities such as conducting a vacuum bake at about 1100° C. to about 1300° C., preferably about 1200° C. to remove volatile impurities. Alternatively, the impurities can be removed during the step of forming closed porosity.

After cold pressing, the die is placed in a quartz cylinder, separated therefrom by an insulating material such as graphite felt. The cold pressed bodies in the die are then subjected to hot pressing. The hot press step can be achieved in an inert gas atmosphere, but is preferably conducted under a vacuum. The actual vacuum which is achieved during hot pressing will depend in part upon the rate at which impurities or other materials out-gas. Apparatus capable of producing about 60 microns of vacuum will suffice. Note that in the discussion that follows with regard to the hot press step, the temperatures are those measured at the top surface of the die by a direct optical method. These temperatures are not necessarily equal to the temperatures of the spinel. Before any pressure is applied, the die is first heated to about 1125° C. Heating is preferably achieved by an induction heating method. The spinel is held at about 1125° C. for about 30 minutes. The pressure and temperature are then both linearly increased over a period of about 1 to 5 hours. The rate of temperature rise and the rate of pressure rise are selected such that the target temperature is never reached substantially before the target pressure is reached. For disks, the target temperature is at least about 1400° C., preferably about 1410° C. The target pressure is at least about 2000 psi (about 13 MPa), preferably about 2200 psi (about 15 MPa). For domes, the target temperature is at least about 1395° C. and preferably about 1460° C., and the target pressure is at least about 2000psi (about 13 MPa), preferably about 3200 psi (about 22 MPa). A temperature which is too high will result in a substantial amount of sublimation of the spinel. A temperature which is too low may result in decreased transparency of the product. Pressures higher than the target pressure are believed to be operable but cause excessive wear of the dies. Pressures lower than the target pressure result in compaction less than that desired and inferior optical clarity. During hot pressing, the spinel normally loses about 3½ weight percent to sublimation.

The spinel is held at the target pressure and temperature for a period of time. The period of time for disks is about 2 to 5 hours. The period of time for domes is about 4 hours.

Following holding at the target temperature and pressure, the heating and pressure are reduced. Cooling occurs in about 12 to 14 hours. When domes are being pressed, after the die has cooled to about 1000° C., it is preferred to reduce the vacuum and to fill the die with a noble gas such as argon.

Another method for producing a closed porosity body is by pressureless sintering. Pressureless sintering, as compared to a hot press process, permits easier control of grain growth during the closed porosity formation step and is more useful in formation of parts having complex geometry. Hot-pressing is, in general, not as suitable for formation of complex-geometry parts. According to this method, the spinel powder is mixed with an amount of binder such as about 5 weight percent of carbowax, and may optionally also be mixed with materials such as surfactants, or lubricants, such as neofat. The powder mix is then compressed at substantially room temperature or is slip cast at room temperature to produce a green body. The green body is then exposed to a temperature, such as greater than about 1800° C. preferably at substantially sub-atmospheric pressure. The atmosphere during said pressureless sintering can be air, hydrogen or vacuum.

The closed porosity body typically has some amount of residual porosity. The hot pressed body typically has a porosity of about 0.01 volume percent or more. The pressureless sintered body typically has porosity of about 1 volume percent or more. In order to produce a body with the desired characteristics, the body is subjected to a second treatment step to reduce or eliminate the residual porosity. In connection with producing a substrate usable for purposes of the present invention, the second step is preferably a hot isostatic pressure treatment. The closed-porosity bodies are preferably inspected for visually-apparent defects and for minimum ultraviolet transmission such as about 65-85 percent transmission of an ultraviolet source having an intensity peak at a wavelength of about 0.25 microns. The parts, preferably separated by graphite spacers, are loaded into a hot-isostatic pressing chamber. The hot isostatic treatment includes heating the body to a target temperature of about 1500° C. to 2000° C., preferably less than about 1800° C., preferably at least about 1500° C. Heating can be accomplished by a resistance heater furnace. The maximum temperature is achieved in an atmosphere which has been pressurized to at least about 15,000 psi (about 100 MPa), preferably more than 25,000 psi (about 170 MPa), and most preferably at least about 29,500 psi (about 205 MPa). The hot isostatic pressure atmosphere is preferably argon or helium. A number of rates of pressurization and heating and depressurization and cooling are operable. In one instance, the chamber is pressurized to about 5,000 psi (about 34 MPa) without heating. The temperature and pressure are then increased linearly such that the target temperature and target pressure are arrived at essentially simultaneously. The heating is at a rate of between about 5° C. per minute and about 25° C. per minute, preferably about 15° C. per minute. The target temperature and target pressure are maintained for a period between about ½ hour and about 5 hours, preferably about 2½ hours. In general, there is an inverse relationship between temperature and hold time, i.e., at higher temperatures, a shorter hold time will be operable. After the hold time or "soak" period, a controlled cool-down is used. The pressure is decreased linearly during the cool-down period at such a rate that when the temperature reaches 600° C., the pressure will be about 10,000 psi (about 70 MPa). The preferred cooling rate is about 5° C. per minute down to the temperature of 600° C. Too rapid cooling, such as more than about 15° C. per minute, may cause thermal shock. After a temperature of 600° C. has been achieved, the furnace is turned off. The pressure, during this period, is decreased linearly at a rate such that when the temperature is 300° C., the pressure is about 7,500 psi (about 50 MPa). At this point, the pressure is allowed to freely vent to the atmosphere and the parts are allowed to cool to a temperature at which they can be handled. Normally, there will be no weight loss of the spinel parts during the hot-isostatic pressing procedure.

In one embodiment of the process, the two steps of the process are accomplished without substantial cooling of the body between steps. According to this method, a formed but unfired compact is sintered to a closed porosity state in a vessel at about atmospheric pressure in an $H_2$ atmosphere or a sub-atmospheric pressure in a vacuum atmosphere, and at a temperature of about 1400° C. Because this process does not require a hot-press step to form the closed porosity body, it can be used in formation of bodies having complex geometry. Hot press techniques are generally not suitable for forming complex geometry bodies. After the compact is sintered to a closed porosity state, the vessel is pressurized to at least about 20,000 psi (about 140 MPa), without substantial cooling of the body, at a temperature of at least about 1400° C. to accomplish the hot isostatic pressure step of the process and reduce or eliminate residual porosity of the body.

Following the hot isostatic pressing step, the body is cooled and is subjected to further steps to modify the surface characteristics of the body. These further steps can include grinding and polishing, and application of an anti-reflection coating.

The spinel substrate is cleaned, such as by degreasing with an organic solvent like carbon tetrachloride, washing in deionized water, washing with detergent in an ultrasonic bath and/or a vacuum bombardment. The substrate is then, as needed, dried, such as by air drying, for 24 hours.

The spinel substrate is then metallized. The preferred metallization method includes spraying a sprayable mixture containing a metallic material onto the substrate and firing the sprayed substrate at an elevated temperature. The preferred metallic material is either tungsten or a mixture of manganese and molybdenum. The tungsten material is preferably mixed with a small amount of yttria, such as providing a mixture of about 97 percent tungsten and about 3 percent yttria. The molybdenum/manganese mixture preferably includes up to about 25 weight percent manganese. In some applications, titanium can be substituted for manganese. A number of other metals are also usable for metallizing the spinel substrate. When the coefficient of expansion of the metal is desirably similar to that of the spinel, metals such as molybdenum, platinum or chromium can be used, or an alloy such as an iron-nickel-cobalt alloy, e.g. Kovar (TM) containing 28 to 29 percent nickel, 17 to 18 percent cobalt and the balance iron. Noble metals which can be used include platinum, paladium, silver and gold and alloys thereof. Active metals which can be used include titanium, zirconium and hafnium. Other metals which can be used in connection with metallization of the spinel substrate include copper, nickel, tantalum, rhenium, iron, titanium, zinc, tin, cadmium, and alloys thereof.

Preferably, the metal is provided in a finely-divided, particulate form. The particles are preferably substantially all less than about 2 microns, more preferably less than about 0.2 microns. For spraying the metal powder is preferably mixed with a carrier, solvent and/or binder. Usable carrier mixtures include nitrocellulose plus butylacetate; ethylcellulose plus terpineol; acrylate plus cyclohexanone; and ethylene carbonate plus ethylcellulose. One operative spraying mixture is a mixture of 60 grams 0.2 micron molybdenum powder, 15 grams 0.2 micron manganese powder, 0.2 grams nitrocellulose, and 26 grams butylacetate. Another operative mixture is 97 grams 325 mesh tungsten, and 3 grams yttria, mixed with 2 grams nitrocellulose and 26 grams butylacetate.

The mixture is sprayed onto the portion of the substrate which it is desired to metallize. When the substrate is to be used as a dome 10 or window 20, the metallizing paste is preferably sprayed onto the edge 12 of the dome 10 or window 20, as shown in FIGS. 13–18, or onto the edge 12 and a peripheral portion 16 of one face of the dome 10 or window 20, as depicted in FIGS. 19–24. Other applications, including laser applications, electronic substrate applications and the like, can include application of the metallizing material by spray methods such as electrostatic spraying or mask spraying or by non-spraying mechanical means, including brushing, roll-coating, transfer tape, silk screening, dipping, transfer pad printing, painting, machine dispensing, calendaring, extrusion, stamping, and doctoring. The metallizing paste is applied in a thickness sufficient that, upon firing, a desired thickness of the metal layer is achieved. Preferably, the thickness in connection with dome 10 and window 20 applications is about 0.001 inches (about 0.02 mm). When metallization is done by some other methods, e.g., vacuum deposition, layer thickness will typically be less, e.g., about 20 microns.

The sprayed-on paste is preferably air dried and the sprayed substrate is fired, such as in a kiln or tunnel oven at a temperature sufficient to obtain the desired adherence. The firing atmosphere is preferably a non-oxidizing atmosphere such as a 25 percent nitrogen, 75 percent hydrogen atmosphere. Preferably, a low dew point atmosphere is provided, such as an atmosphere with a due point of less than about 20° C. (about 70° F.). Firing temperature is preferably about 1200° C. to about 1800° C., more preferably about 1500° C. to about 1800° C. Firing time is preferably about ½ hour.

Following cooling of the fired part, the parts may be polished as desired. The metallized parts can be coated, such as with an anti-reflection coating, and/or, if desired, further metallization steps can be used to provide a part with multiple layers of metallization. The metallized spinel can be further treated by providing additional electroplated layers, e.g. silver, nickel, copper or the like. For electronics use, desired patterns can be provided on the substrate by conventional photo-resist and etching processes.

EXAMPLES

EXAMPLE 1

0703 Sintered bodies of magnesia-alumina spinel are formed from a powder having less than 5 parts per million by weight of oxides of any of Cr, Cu, Fe, Ga, Mn, Pb, Ti, V, and Zn and having less than 50 ppm of the total of all of the above oxides. The powder has less than 1,000 ppm of carbon and less than 10 ppm of calcium, less than 30 ppm sodium, less than 500 ppm sulfur, and less than 1,000 ppm silicon. The molar ratio of $Al_2O_3$ to MgO is 1:1. The average particle size is submicron. The powder is mixed with 1½ weight percent LiF. The powder is loaded in a graphite dye and cold-pressed at about 1,000 psi (0.7 MPa). The cold-pressed body was hot-pressed at a temperature of about 1400°

C. with a uni-axial pressure of about 2,200 psi (about 15 MPa) with a "soak" of about 5 hours. After cooling, the bodies are hot isostatically pressed at a temperature of 1500° C. and a pressure of about 29,500 psi. After cooling, the bodies are polished. The bodies are cleaned in an ultrasonic bath and dried. A metallizing compound of 60 percent molybdenum, 15 percent manganese, mixed with binders is applied to a surface of the spinel substrate. After drying, the substrate is fired in a nonoxidizing atmosphere at 20° C. dew point with a firing temperature of about 1800° C. for ½ hour. Adhesion is found to be superior to the adhesion obtained when the same type of metallization is used on a sapphire substrate. Optical transmission quality of the metallized spinel is approximately equal to the optical transmission quality of the unmetallized spinel.

EXAMPLE 2

This example relates to metallization of spinel other than that which is claimed. However, it is believed that the metallization layer in the claimed metallized spinel is at least as adherent as that discussed in this example.

Two 1-inch diameter by 0.03-inch thick round disks of cold-pressed and sintered spinel were metallized with tungsten-yttria metallizing. The disks were cleaned using a detergent in an ultrasonic bath. After drying, the metallizing compound of 97 percent, 325 mesh tungsten, 3 percent, 325 mesh yttria, was put into a slurry and a heavy coat was sprayed on each surface the spinel disks. After air drying for 24 hours, the disks were fired in a furnace in 25 percent nitrogen, percent hydrogen, atmosphere with a 70° F. (about 20° C.) dew point. The disks were fired at 1800° C. for ½ hour. After cooling, the parts were polished. Optical transparency was found to have been unaffected by the metallizing. A pull-test was conducted by brazing a 0.04-inch head Kovar pin to the metallization in a furnace at 1120° C. with a 5 second soak. After cooling, a pull strength was measured at 25 pounds, equivalent to 20,000 psi (about 135 MPa).

A second pull-test was conducted after brazing a Kovar pin at 1150° C. for 30 seconds. The pull strength was 15 pounds, equivalent to about 12,000 psi (about 80 MPa). Without wishing to be bound by any theory, it believed the higher brazing temperature resulted alloying of the copper and tungsten, making a weak system.

EXAMPLE 3

Sintered bodies of magnesia-alumina spinel a are formed by a method as described in Example 1. Aft cooling, the bodies are polished. The bodies a cleaned in an ultrasonic bath and dried. A metallizing compound of 97 percent, 325 mesh tungsten, 3 weight percent, 325 mesh yttria, is formed into a slurry with carrier of nitrocellulose plus butylacetate. The slurry is sprayed onto a surface of the spinel substrate. After air drying for 24 hours, the sprayed substrate fired in a 25 percent nitrogen 75 percent hydrogen atmosphere at 20° C. dew point, with a firing temperature of 1800° C. for ½ hour. A 0.04-inch head Kovar pin is brazed to the metallization in a furnace at 1120° C. with a 5 second soak. After cooling, a pull strength is measured at at least 25 pounds, equivalent to at least 20,000 psi.

A second pull-test is conducted after brazing a Kovar pin at 1150° C. for 30 seconds. The pull strength is at least 15 pounds, equivalent to about 12,000 psi (about 80 MPa).

EXAMPLE 4

Sintered bodies of magnesia-alumina spinel are formed from a powder as described in Example 1. The bodies are cleaned and metallized in the manner described in Example 1 except that the metallizing compound is a mixture of 60 grams 0.2 micron molybdenum powder, 15 grams, 0.2 micron manganese powder, 0.2 grams nitrocellulose, and 26 grams butylacetate. A pull-test is conducted by brazing a 0.04-inch head Kovar pin to the metallization in a furnace at 1120° C. with a 5 second soak. After cooling, a pull strength is measured at at least 25 pounds, equivalent to at least 20,000 psi (about 135 MPa).

A second pull-test is conducted after brazing a Kovar pin at 1150° C. for 30 seconds. The pull strength is at least 15 pounds, equivalent to at least about 12,000 psi (about 80 MPa).

For comparison purposes, the pull-test strength of metallization for a number of (non-spinel) metallized substrates is provided in Table 5.

TABLE 5

| Substrate | Metallization Material | Adhesion Strength |
|---|---|---|
| $Al_2O_3$ | Mo, $Al_2O_3$, MnO, $SiO_2$ | 39–80 |
| $Al_2O_3$ | Mo, $Al_2O_3$, CaO, MgO | 20–85 |
| $Al_2O_3$ | 80% Mo, 20% Mn | 32–90 |
| $Al_2O_3$ | Titanium | .07–.11 |
| $Al_2O_3$ | Nb | 15–120 |
| $Al_2O_3$ | $MoO_3$, $MnO_2$, CaO | 26.9–54.2 |
| $Al_2O_3$ | Ammonium, Molybdate, Manganese nitrate | 17.3–41.4 |
| $Al_2O_3$ | $WO_3$, $MnO_2$, $Fe_2O_3$ | 19.3–.50 |
| $Al_2O_3$ | Mo | 33.5–59.3 |
| $Al_2O_3$ | Cu | 5–50 |

In light of the above, a number of advantages of the present invention can be seen. A metallized ceramic having high ultraviolet transmittance is provided with a metallized surface for, for example, attachment to other objects. The metallized layer has high adherence, such as at least about 50 MPa, preferably at least about 80 to about 130 MPa. The metallized layer retains good adherence at high temperature environments, such as about 500° C. (about 1000° F.). The metallization process does not substantially degrade or deteriorate the optical qualities of the spinel, and particularly does not degrade the ultraviolet and infrared transmission properties.

The transparent body is particularly useful as an optical element in electro-optical systems that will be exposed to extreme environments, such as high-abrasion, high-heat, high-stress, or high-corrosion environments. Applications includes missile or guided artillery components including guidance system components, such as domes, windows, lenses and prisms, as well as armor and fuse covers.

The configuration, i.e. the size and shape of the body produced by the above-described process, will depend upon the particular application contemplated. Referring to FIGS. 13–15 and 19–21, a dome 10 can be provided in a number of configurations. As depicted in FIGS. 1 and 2, and particularly in contemplation of use of the dome in connection with the Stinger-RMP ("reprogramable microprocessor") missile, the dome 10 is preferably in the form of a sector of a spherical shell. The outer radius of the finished dome 10 is preferably about 1.350 inches (about 33 mm) and the inner radius is preferably about 1.297 inches (about 31.7 mm) to provide a dome thickness of about 0.053 inches (about 1.3 mm).

As depicted in FIGS. 16–18 and 22–24, the launch tube window 20 is preferably 90 millimeters (3.350 inches) in diameter and 1.57 millimeters (0.064 inches) in thickness. The thickness of the window 20 is selected to provide for the desired rupturing of the window upon launch. A thicker window 20, will, in general, withstand a higher overpressure before rupturing occurs. The window 20 preferably has beveled edges as depicted in FIGS. 16–17 and 22–23.

Referring to FIG. 25, the missile 30 is provided with a dome 10 beneath which is mounted sensing instrumentation (not shown), for example, infrared and/or ultraviolet guidance or tracking sensing instrumentation. The dome 10 is attached to the missile 30 by brazing the metallized edge 12 and/or surface 16 to a ring of metallic material (not shown). The launch tube 32 for the Stinger-RMP is a generally cylindrically-shaped tube sealed at both ends. The end of the launch tube 34 which is adjacent to the nose end 36 of the missile is sealed by the launch tube window 20, such as by brazing the metallized edge 12 and/or peripheral surface 16 to a ring of metallic material (not shown). By using the launch tube 32 to provide a sealed environment for the missile 30, the missile components are preserved in relative cleanliness to prevent deterioration of the missile operating parts which would result form exposure to environmental contaminants. The missile 30 is intended to be launched by aiming the launch tube 32 towards the target to allow the optical guidance system of the missile to receive optical radiation from the target through both the launch tube window 20 and the missile dome 10. In connection with this launching mode, the launch tube window 20 must have transmittance properties at the ultraviolet and infrared wavelength regions in order to permit the missile guidance system to receive optical radiation while the missile is still in the launch tube.

Because the launch tube window 20 and the dome 10 are exposed to sunlight and thus to ultraviolet radiation during transport and use, the launch tube window 20 and dome 10 must retain infrared and ultraviolet transparency properties as well as strength and hardness properties under conditions of exposure to light, such as ultraviolet light.

As will be apparent to those skilled in the art, a number of modifications and variations of the abovedescribed metallized substrate and process can be used. Metallizing can be achieved by a number of processes in addition to slurry deposition and firing, including electroplating, electro-deposition and electrolysis, electroless-deposition, reducing an oxide powder (e.g. thermal reduction of a precious metal, copper or nickel metal salt), pressure diffusion, evaporation, sputtering (such as magnetron sputtering, reactive sputtering, or ion beam sputtering), plasma methods, ion implantation or ion plating, chemical vapor deposition, graded powder methods, sintered metal powder processes, flame or electro-thermal spraying, vacuum deposition or vacuum plating, direct bonding of a metal sheet, e.g. a copper sheet, heated in contact with the substrate, and epitaxy.

Although the present invention has been described with reference to certain embodiments, it should be appreciated that further modifications can be effected within the spirit and scope of the invention, as limited only by the appended claims.

What is claimed is:

1. A metallized, sintered polycrystalline body having a transmittance per 1.88 mm thickness in all wavelengths from about 0.4 microns to about 0.5 microns of not less than about 84% produced by a process, comprising:
   providing a powder comprising at least 97 weight percent magnesia-alumina spinel;
   producing a closed porosity body from said powder;
   heating said closed porosity body to at least about 1400° C. at an elevated pressure of at least about 20,000 psi to reduce residual porosity;
   providing a mixture comprising a metallic material;
   applying said mixture to said reduced residual porosity body to produce a body which is at least partly coated;
   firing said coated body at a temperature of at least about 1200° C. to produce a body with a metallized layer.

2. A metallized body, as claimed in claim 1, wherein: said metallized layer is sufficiently adhered to said substrate to substantially retain said adherence under a pulling pressure of about 12,000 psi.

3. A metallized body, as claimed in claim 1, wherein: said metallized layer is sufficiently adhered to said substrate to substantially retain said adherence under a pulling pressure of about 20,000 psi.

4. A metallized body, as claimed in claim 1, wherein: said metallic material at least includes tungsten.

5. A metallized body, as claimed in claim 1, wherein: said mettalic material at least includes yttria.

6. A metallized body, as claimed in claim 1, wherein: said metallic material at least includes molybdenum.

7. A metallized body, as claimed in claim 1, wherein: said metallic material at least includes a mixture of molybdenum and manganese.

8. A metallized body, as claimed in claim 1, wherein: said metallized body has a flexural strength of at least about 15,000 psi.

9. A metallized body, as claimed in claim 16, wherein: said reduced porosity body has a knoop hardness of at least about 1350 kg mm$^{-2}$.

10. A metallized body, as claimed in claim 1, wherein: said reduced porosity body has a grain size less than about 150 microns.

11. A metallized body, as claimed in claim 1, wherein: said metallized body has a tensile strength of at least about 12,000 psi.

12. A metallized body, as claimed in claim 1, wherein: said body has a maximum strength such that a 3 inch diameter disk having a thickness of about 0.06 inches bursts when subjected to a pressure of more than about 25 psi.

13. A metalized body, as claimed in claim 1, wherein: said metallized body has a scratch-dig size of less than about 20/20.

14. A metallized, sintered polycrystalline ceramic body, comprising:
   a substrate consisting essentially of magnesia-alumina spinel having a metallic material coated thereon;
   said body having an in-line transmittance per 1.88 mm thickness in all wavelengths from about 0.3 microns to about 0.8 microns of not less than about 85%; and
   said substrate retaining at least about 99% of its original transmissivity after 200 hours of exposure at a distance of about 150 cm to ultraviolet light of a wavelength of about 0.254 microns and intensity of about 700 microwatts/cm$^2$.

15. A metallized, sintered polycrystalline ceramic body, comprising:
- a substrate consisting essentially of magnesia-alumina spinel having a metallic material coated thereon, wherein the ratio of said magnesia to said alumina is in the range from about 0.95:1 to about 1.05:1;
- said substrate having an in-line transmittance per 1.88 mm thickness at some wavelength int he wavelength range from about 0.2 microns to about 0.3 microns of not less than about 72%.

16. A metallized, sintered polycrystalline body, comprising:
- a substrate consisting essentially of magnesia-alumina spinel, wherein said magnesia and said alumina are in a ratio from about 0.95:1 to about 1.05:1, coated with a metallization layer at least including a metallic material;
- said substrate having an in-line transmittance per 1.88 mm thickness in all wavelengths in the wavelength range from about 0.2 microns to about 0.4 microns of not less than the transmittance shown by line A in FIG. 2.

17. A metallized body, as claimed in claim 16, wherein:
- said metallization layer has sufficient adherence to said substrate to substantially retain adherence under a pulling pressure of about 12,000 psi.

18. A metallized body, as claimed in claim 16, wherein:
- said metallization layer has sufficient adherence to said substrate to substantially retain adherence under a pulling pressure of about 20,000 psi.

19. A metallized body, as claimed in claim 16, wherein:
- said metallic material at least includes tungsten.

20. A metallized body, as claimed in claim 16, wherein:
- said metallic material at least includes molybdenum.

21. A metallized body, as claimed in claim 16, wherein:
- said substrate has a knoop hardness of at least about 1350 kg mm$^{-2}$.

22. A metallized body, as claimed in claim 16, wherein:
- said substrate has a flexural strength of at least about 15,000 psi.

23. A metallized body, as claimed in claim 16, wherein:
- said substrate has a grain size less than about 150 microns.

24. A metallized body, as claimed in claim 16, wherein:
- said substrate has a tensile strength of at least about 12,000 psi.

25. A metallized body, as claimed in claim 16, wherein:
- said substrate has a maximum strength such that a 3 inch diameter disk having a thickness of about 0.06 inches burst when subjected to a pressure of more than about 25 psi.

* * * * *